(12) United States Patent
Villain

(10) Patent No.: US 9,672,997 B2
(45) Date of Patent: Jun. 6, 2017

(54) METHOD FOR THE INITIAL ADJUSTMENT OF A CONTROL DEVICE FOR ELECTRONIC EQUIPMENT

(71) Applicant: C&K Components S.A.S., Dole (FR)

(72) Inventor: Jean-Christophe Villain, Dole (FR)

(73) Assignee: C&K Components S.A.S., Dole (FR)

( * ) Notice: Subject to any disclaimer, the term of this patent is extended or adjusted under 35 U.S.C. 154(b) by 200 days.

(21) Appl. No.: 14/511,826

(22) Filed: Oct. 10, 2014

(65) Prior Publication Data
US 2015/0101184 A1 Apr. 16, 2015

(30) Foreign Application Priority Data
Oct. 11, 2013 (FR) ..................... 13 59892

(51) Int. Cl.
*H01H 11/00* (2006.01)
*H01H 3/12* (2006.01)
*H01H 11/06* (2006.01)
*H01H 11/04* (2006.01)
*G06F 3/01* (2006.01)
*G06F 3/02* (2006.01)
*G06F 3/0338* (2013.01)

(52) U.S. Cl.
CPC ............ *H01H 11/00* (2013.01); *G06F 3/016* (2013.01); *G06F 3/0202* (2013.01); *G06F 3/0338* (2013.01); *H01H 3/12* (2013.01); *H01H 3/122* (2013.01); *H01H 3/125* (2013.01); *H01H 11/0006* (2013.01); *H01H 11/04* (2013.01); *H01H 11/06* (2013.01); *Y10T 29/49105* (2015.01); *Y10T 29/49126* (2015.01)

(58) Field of Classification Search
CPC .......... H01H 3/12; H01H 3/122; H01H 3/125; H01H 11/00; H01H 11/0006; H01H 11/04; H01H 11/06; G06F 3/016; G06F 3/0202; G06F 3/0338; Y10T 29/49105; Y10T 29/49126
See application file for complete search history.

(56) References Cited

U.S. PATENT DOCUMENTS 3,909,768 A * 9/1975 Woods ................... H01H 11/06
200/283
6,100,482 A * 8/2000 Koma ................... H01H 3/122
200/344

FOREIGN PATENT DOCUMENTS

| EP | 0897586 B1 | 10/1999 |
| EP | 2648074 A1 | 10/2013 |
| JP | 11306901 A * | 11/1999 |

* cited by examiner

*Primary Examiner* — A. Dexter Tugbang
(74) *Attorney, Agent, or Firm* — Fox Rothschild LLP

(57) ABSTRACT

A method for control device adjustment comprising applying a preload simultaneously to a plurality of shafts of a control device so as to take up initial assembly play, wherein the control device comprises an upper actuating element that is movable relative to a lower supporting mounting, a lower supporting mounting, a switch that is actuated by the upper actuating element, and an articulated structure that is interposed vertically between the upper actuating element and the lower mounting to keep the upper actuating element parallel to a horizontal plane during its vertical downward movement relative to a frame, and the at least one shaft. The method also comprises providing an adjustment stop fixed relative to the lower mounting and forming a stop surface that interacts with a facing portion of the shaft.

12 Claims, 22 Drawing Sheets

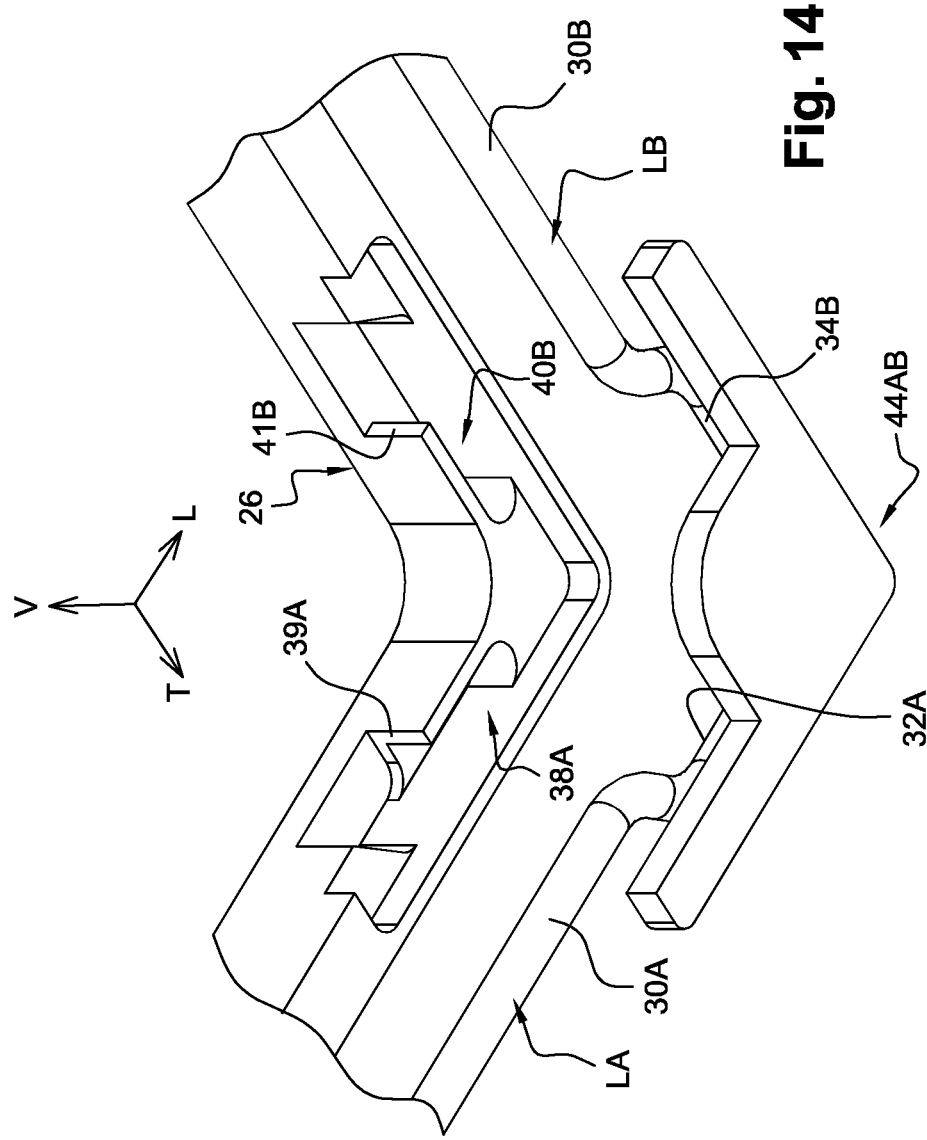

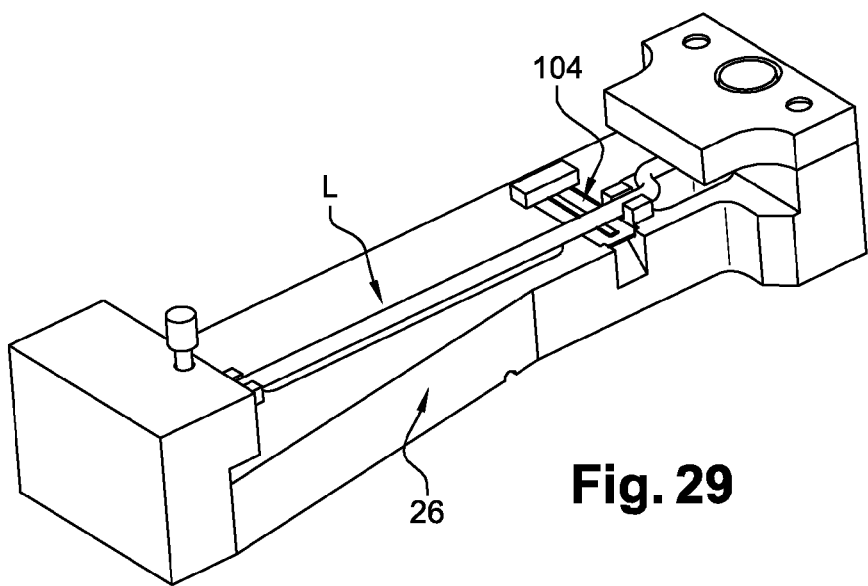
Fig. 29
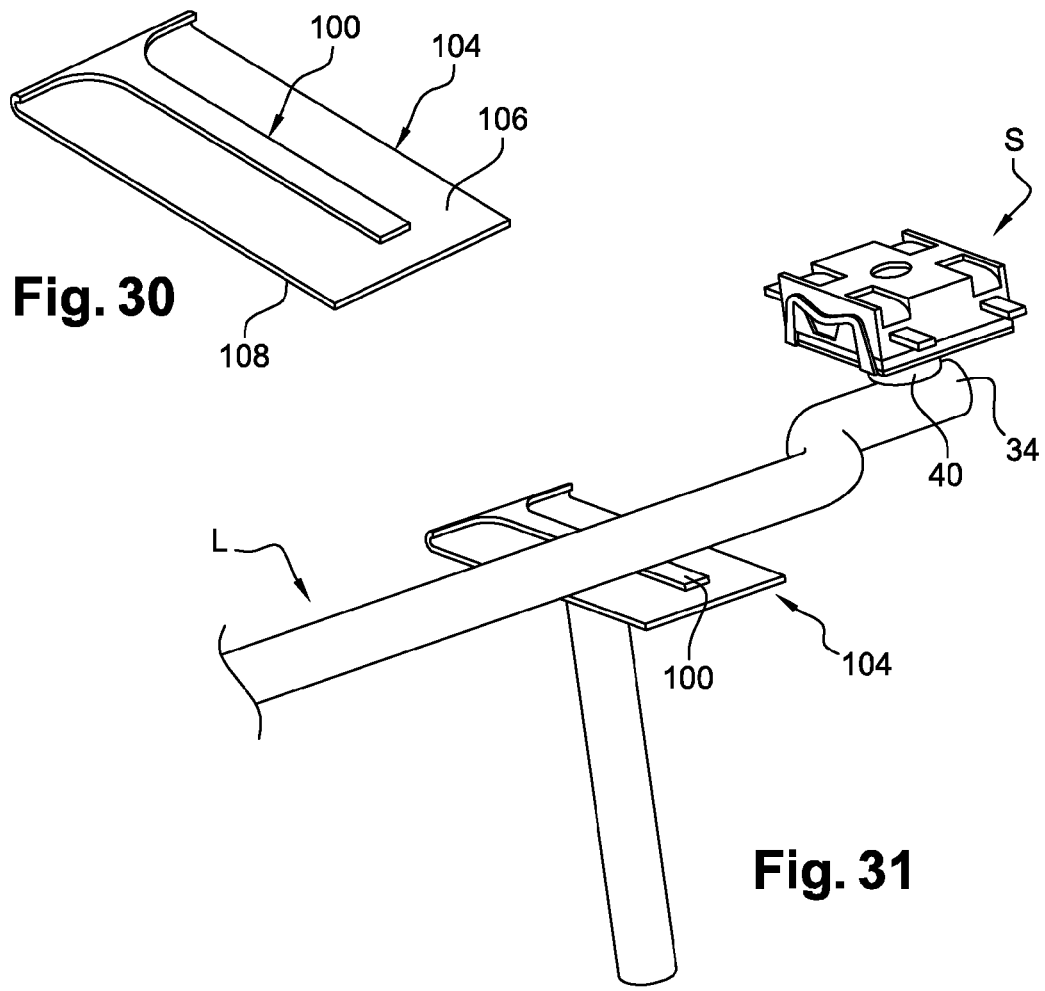
Fig. 30
Fig. 31

METHOD FOR THE INITIAL ADJUSTMENT OF A CONTROL DEVICE FOR ELECTRONIC EQUIPMENT

RELATED APPLICATIONS AND CLAIM OF PRIORITY

This patent application claims the benefit of priority to French Application Serial Number 1359892, filed on Oct. 11, 2013, titled "Method for the initial adjustment of a control device for electronic equipment," the disclosure of which is hereby incorporated by reference in its entirety.

BACKGROUND

The presently disclosed embodiments relate to a control device for electrical or electronic equipment, having a movable upper member, notably in the form of an actuating panel or button, on which at least one control action is exerted. More specifically, the disclosed embodiments relate to a method for the initial adjustment of a device of this type.

SUMMARY

A method for the adjustment of a control device for electronic equipment is described in detail below.

In an embodiment, the method comprises applying a preload simultaneously to a plurality of shafts of a control device so as to take up the initial assembly play.

The above mentioned control device comprises an upper actuating element having an upper actuating face, on which a user can exert at least one control action by applying a generally downwardly directed pressure to this upper face, a lower supporting mounting, the upper actuating element being mounted so as to be movable relative to this mounting by a vertical movement between an upper rest position, towards which the upper actuating element is returned elastically, and an active lower position, a switch which is actuated by the upper actuating element when the upper actuating element is in its active lower position, and an articulated structure which is interposed vertically between the upper actuating element and the lower mounting to keep the upper actuating element parallel to a horizontal plane during its vertical downward movement relative to the frame, and which includes at least one shaft.

The embodiment also comprises providing an adjustment stop, fixed relative to the lower mounting and forming a stop surface which interacts with a facing portion of the at least one shaft associated with this stop, for positioning the at least one shaft relative to the lower mounting; and removing the preload (P).

The step of providing the stop comprises positioning a stop member relative to the lower mounting so that a front end of this stop member is in contact with the facing portion of the shaft. The stop member is also immobilized relative to the mounting. Immobilizing the stop member comprises causing the plug of adhesive to dry or causing the plug of resin adhesive to harden.

The stop member may be a plug of adhesive or resin which is positioned into a hole in the lower mounting and which has a front end in contact with the facing portion of the at least one shaft.

The stop member may be interposed vertically between the facing portion of the at least one shaft and the lower mounting, with a front end face in contact with the facing portion of the at least one shaft. Immobilizing the stop member comprises positioning a plug of adhesive or resin between a rear end of the stop member and the lower mounting, and causing the plug of adhesive to dry or causing the plug of resin adhesive to harden;

The stop member may be a stop pin which is mounted so as to be axially slidable in a vertical direction in a complementary hole in the lower mounting, and which has its front end in contact with the facing portion of the at least one shaft, and immobilizing the stop member comprises positioning a plug of adhesive or resin into the hole in contact with the rear end of the pin, and causing the plug of adhesive to dry or causing the plug of resin adhesive to harden;

The preload may be applied by means of a removable preloading pin which is guided in a vertical sliding movement relative to the lower mounting;

An elastically deformable member, forming a spring for taking up the play that develops during the use of the device, may be interposed vertically between the front end of the stop pin and the facing portion of the at least one shaft;

For the adjustment of a control device for electronic equipment having an articulated structure including a plurality of shafts, the design of each of the shafts being similar to that of the at least one shaft, the method comprises:

Applying a preload simultaneously to a plurality of shafts of a control device so as to take up the initial assembly play.

For each of the shafts, providing an adjustment stop, fixed relative to the lower mounting and forming a stop surface which interacts with a facing portion of the shaft associated with this stop, for positioning each shaft relative to the lower mounting, and removing the preload.

BRIEF DESCRIPTION OF THE DRAWINGS

Other characteristics and advantages of the embodiments above will be made clear by the following detailed description, the comprehension of which will be facilitated by reference to the attached figures, of which:

FIGS. 13 and 14 are perspective views taken at two different viewing angles, showing some example components of the device at a corner of the device;

FIG. 29 is a schematic view which shows, in perspective, another variant application of the adjustment method according to an embodiment, in association with a frame simulating the control member;

FIG. 30 is a detail view showing the spring for taking up the play of FIG. 29 in its free state;

FIG. 31 is a larger-scale perspective view of some of the components of FIG. 29;

Figure 1:
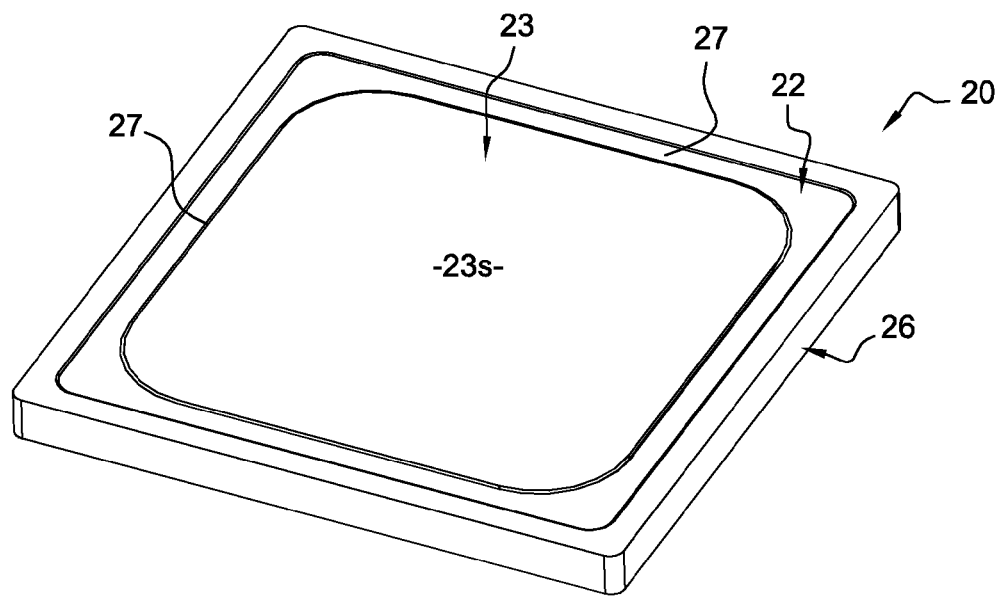
FIG. 1 is schematic perspective representation of an example of an embodiment of a control device that can be carried out by means of the methods described herein.

The vertical, longitudinal and transverse orientations according to the frame of reference V, L, T shown in the figures will be used, in a non-limiting way and without any limiting reference to the Earth's gravity, the horizontal plane corresponding to the plane of the axes L and T.

In the following description, identical, similar or analogous elements will be denoted by the same numeric or alphanumeric references.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

The description that follows is of a method for the adjustment of a control device for electronic equipment, wherein the control device comprises parts such as those described below.

An upper panel extending in a generally horizontal plane and having an upper face, called the actuating face, on which, by means of a control member, a user can exert at least one control action by applying a generally downwardly directed pressure to this upper face.

A lower supporting mounting, the upper panel being mounted so as to be movable relative to this mounting, as a result of the control action, by a vertical movement between an upper rest position, towards which the panel is returned elastically, and an active lower position;

A switch which is actuated directly or indirectly by the upper panel to produce a control signal for the electronic equipment when the upper panel is in its active lower position; and An articulated structure which is interposed vertically between the upper panel and the frame to keep the upper panel generally parallel to itself in a horizontal plane during its vertical downward movement relative to the frame.

A control device of this type may be made in such a way that, as a result of the control action, the upper panel can move downwards by a movement generally comprises a vertical translation, so as to act on the switch in order to cause the actuation thereof, that is to say in order to cause a change of switching state, for example by making the electrical switch change from a rest state, in which it is normally open, to an active closed state.

The articulated structure interacts with the upper panel and with the lower mounting, notably in order to suspend and hold the upper panel substantially parallel to its horizontal plane when a control action capable of causing its vertical movement is exerted.

U.S. Pat. No. 6,704,005, the disclosure of which is incorporated herein by reference in its entirety, describes and illustrates a control device in which the switch or switching device is of the monostable type with a rapid change of state that provides a tactile sensation of a change of state, and is arranged in such a way that its axis of actuation is placed generally in the centre of the upper actuating face which is delimited by a rectangular contour.

French patent application no. 1253129 of 5 Apr. 2012 (the disclosure of which is incorporated herein by reference in its entirety) describes and illustrates a device for holding the upper panel parallel to its horizontal plane regardless of the point of application of the control action, in which the upper actuating panel acts directly on the switch, and in which the vertical axis of actuation of the switch, which is carried by the lower mounting or by the upper panel, is placed on the periphery of the contour of the upper panel.

In addition, the articulated structure includes a plurality of consecutive shafts for transmitting forces and movements towards the switch, each of which extends in a rectilinear direction and is placed along an associated edge of the contour of the upper actuating face. The shafts have a first distal end portion (relative to the switch) which bears vertically downwards against a distal contact point belonging to the lower mounting, and vertically upwards against a distal contact point belonging to the upper panel. A second proximal end portion (relative to the switch) of the shaft bears vertically upwards against a proximal contact point belonging to the lower mounting, and vertically downwards against a proximal contact point belonging to the upper panel;

For each shaft, its two contact points, distal and proximal, with the upper panel are arranged longitudinally along a first longitudinal geometrical axis. In addition, its two contact points, distal and proximal, with the lower mounting are arranged longitudinally along a second longitudinal geometrical axis which is parallel to the first geometrical axis.

According to an embodiment, after assembly, and in order to take up all the play due to assembly, each shaft is associated with at least one adjusting screw which is associated adjustably, by screwing or unscrewing, in a vertical direction with the lower mounting. Each adjusting screw has a bearing or contact surface interacting with a facing portion of the shaft associated with this adjusting screw. After assembly, each adjusting screw is adjusted in a vertical direction relative to the lower mounting so as to take up the play and put the associated shaft under very light pressure, after which the adjusting screw is immobilized relative to the lower mounting while maintaining the preload applied to the shaft.

This adjustment method, in which the adjusting screw acts both as the mechanical member providing the loading function and as a stop member after the loading and the take-up of the play, is difficult to use because it does not enable a preload having a known predetermined value to be applied in a precise, reliable way.

Moreover, if this initial adjustment is to be performed for all the shafts of the articulated structure, this method is even more difficult to apply, because the use of each adjusting screw affects the previous adjustment made on another shaft with another screw, so that it is impossible to adjust all the shafts at the same time.

An embodiment can also be applied to a control device of the type described and illustrated in the document France patent 2 (the disclosure of which is incorporated herein by reference in its entirety), for the adjustment of the arms and/or levers belonging to the articulated structure interposed between the upper actuating panel and the lower supporting mounting, notably for the initial adjustment of the actuating arms (or shafts) of the switch. In this document, the various examples relate to designs in which the upper control panel acts indirectly on the switch, through an end portion of an arm and/or lever belonging to the articulated structure.

The figures show a device 20 of the type described and illustrated in French patent application no. 1253129 of 5 Apr. 2012 (the disclosure of which is incorporated herein by reference in its entirety), for controlling electronic equipment such as a computer, a portable digital assistant, often referred to by its English abbreviation PDA, for "Personal Digital Assistant", or a smartphone, combining the characteristics of a PDA and a digital telephone, or a remote controller for the remote control of various electronic equipment such as, for example, audiovisual equipment, air conditioning equipment, etc.

The control device has an upper panel 21 on which a user acts to control the electronic equipment.

The upper panel 21 comprises, overall, a flat element which is horizontally orientated and has a square rectangular shape, the sides of which are parallel to the longitudinal direction L and the transverse direction T.

In this case, the upper panel 21 is composed, by way of non-limiting example, of two parts including a peripheral frame 22 and an "active" central block 23, which form an integrated whole in the assembled position of these two components.

The actuation of the control device 20 comprises exerting an action, referred to hereafter as the "control action", on the upper face 23s of the central block 23 of the upper panel 21, by means of a pointing device which is, for example, a stylus, or the end of a user's finger (not shown).

The control action comprises a pressure orientated primarily in the vertical downward direction V, which is exerted by the pointing device at a contact point between one end of the pointing device and the upper face 23s.

According to an embodiment, the central block 23 comprises solely of a plate, made for example from rigid plastic material, to form a simple control "button".

According to another embodiment, the central block 23 is "active" and includes means for locating the position of the contact point on the upper face 23s.

In this case, the control device 20 is of the type called a "touch pad", used for a laptop computer for example.

According to another embodiment, the block 23 of the upper panel 21 includes, in addition to the means for locating the contact point, data display means such as a display screen, to enable the user to see data relating to the electronic equipment and/or data associated with the operations performed by the user on the upper panel 21.

In this case, the upper panel 21 is a component commonly called a "touch screen".

The control device 20 is, for example, intended to be mounted in electronic equipment in such a way that the upper face 23s of the block 23 of the upper panel 21 is flush with a trim element or a casing element of the electronic equipment.

The frame 22 of the upper panel 21 is a peripheral frame which surrounds the central block 23 and which has a generally square shape and is, for example, a part made by moulding from plastic material, the structure of which is described in greater detail below.

The control device 20 also includes a lower mounting 26, by means of which the control device 20 is assembled and fixed in the electronic equipment.

The lower mounting 26 is shown in the figures in the form of a square frame which, in the assembled position of the main components of the control device 20, surrounds the peripheral frame 22 of the upper panel 21 in such a way that, as can be seen, notably, in FIG. 1, the three components 22, 23 and 26 extend in the same horizontal plane so as to form a control device 20 of generally flat shape having a low height, equal for example to the vertical thickness of the frame 26.

The frame 26 is, for example, fixed to a printed circuit board (PCB) of the electronic equipment, and the whole central part within the frame 26 located under the upper panel 21 is left free for the arrangement of electronic or electrical components and corresponding circuits on the upper face of the printed circuit board.

Like the frame 22 of the upper panel 21, the lower mounting 26 is, for example, made by moulding from plastic material.

The detailed design of the lower mounting 26 is described below in greater detail.

The control device 20 further includes an articulated structure which is interposed, generally vertically, between the frame 22 of the upper panel 21 and the lower mounting 26 to keep the upper panel 21 parallel to the horizontal plane, that is to say parallel to itself, during the vertical movements of the upper panel 21 relative to the frame 26, and notably during any downward vertical movement of the upper panel 21.

In this case, the articulated structure is composed of four consecutive peripheral shafts LA, LB, LC and LD, for the transmission of forces and movements.

Each shaft extends in a generally rectilinear direction and is placed along an associated edge of the contour 27 of the upper actuating face 23s of the control device 20.

For ease of description and understanding, each "side" of the control device 20 is thus associated with an index letter A, B, C, or D, and each of the angles or corners of the device is associated with a pair of index letters A and B, B and C, C and D, or D and A respectively.

The control device includes a switch S arranged at its corner AD, and each shaft thus includes, by definition, a proximal longitudinal end located nearer to the switch S and a distal longitudinal end located farther from the switch S.

Thus identical, analogous or similar components or arrangements are denoted by the same numeric or alphanumeric references with the indices A, B, C or D, according to the side of the control device and/or the corresponding shaft.

The switch S is adapted to be actuated when the upper panel 21 is moved downwards by the effect of the control action, consequently producing a control signal intended for the electronic equipment.

The switch S may be of any known type.

The pressure exerted on the upper panel 21 is transmitted to the switch S so that the latter is actuated by the effect of the control action applied to the upper panel 21.

According to an embodiment, the switch S is adapted to produce the control signal when it is subjected to a pressure above a predetermined value.

Thus the switch S can be used to detect any control action that comprises exerting a pressure above a value called the predetermined threshold value on the upper face 23s of the upper panel 21.

According to another embodiment, if the value of the control action is below the threshold value, the switch S forms a stop for the upper panel 21 at a certain vertical position, or height, relative to the lower mounting 26, by blocking the movement of the upper panel 21 in a downward direction relative to the lower mounting 26.

In this "high" rest position, the switch S is not actuated and the control signal is not produced.

If, as shown schematically in the figures, the switch S is formed by a "dome", the general design of which is known, adapted to change its state when the value of the control action becomes higher than the threshold value, it is this dome that forms the aforementioned stop.

When the switch S changes state, it ceases to form a stop for the upper panel 21 (which is retracted), thus allowing the upper panel 21 to move vertically downwards to a low position called the actuating, or triggering, position of the switch S.

The control signal is then produced when the switch S changes state, that is to say when, in a known way, the lower conducting face of the dome establishes a switching channel with associated electrical tracks (not shown) arranged in a facing position, in this case in the lower mounting 26.

Because of the sudden change of state of the dome of the switch S, a tactile sensation is also perceived by the user, through the pointing device or through his finger, because the user senses, notably, a rapid change in the resistance to movement of the upper panel 21, like the "click" of a push button.

The user is thus informed in a tactile way that the control action has been exerted on the control device 20 and has caused the production of a control signal by means of the switch S.

Figure 7:
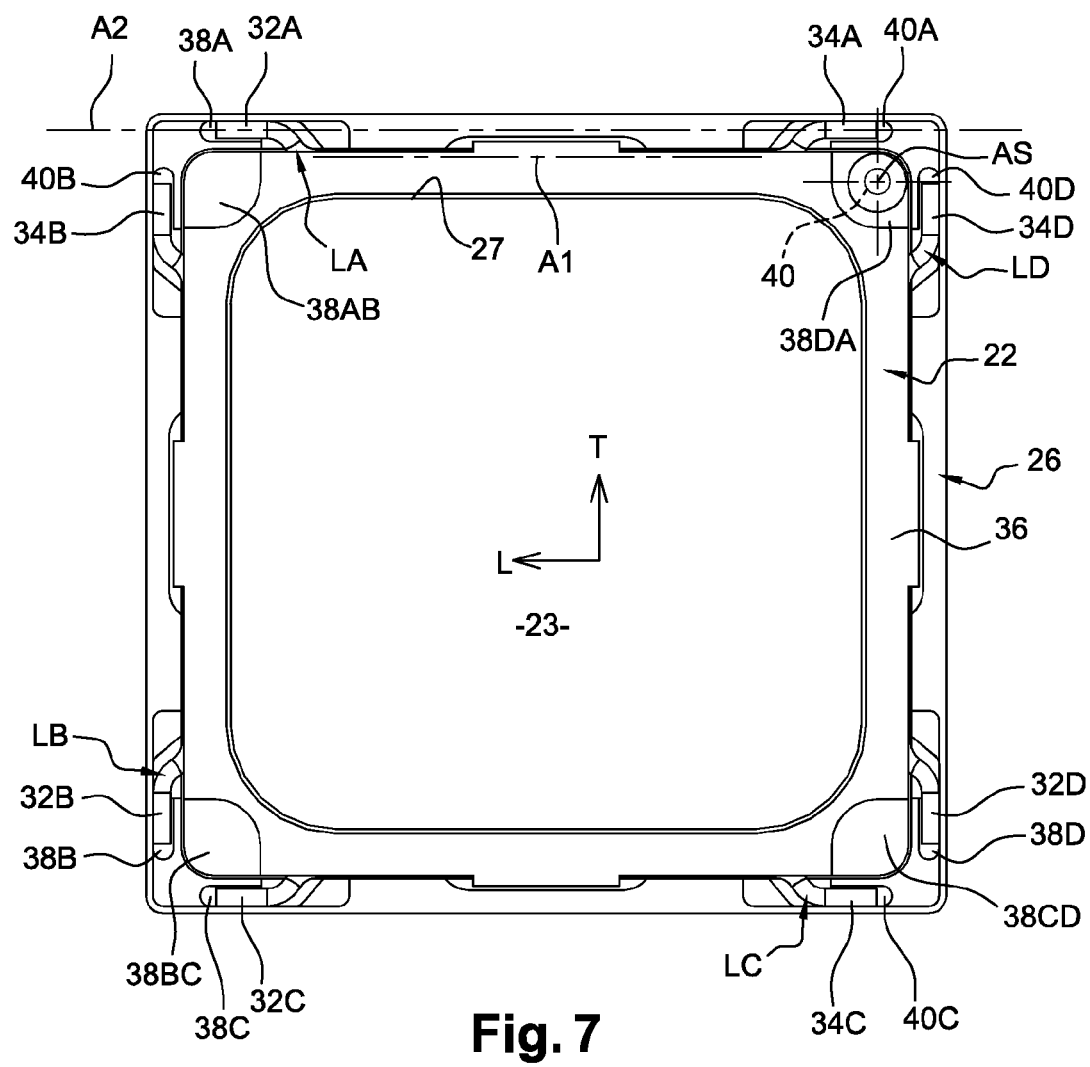
FIG. 7 is a view similar to that of FIG. 6, showing some example components of the device.
Figure 8:
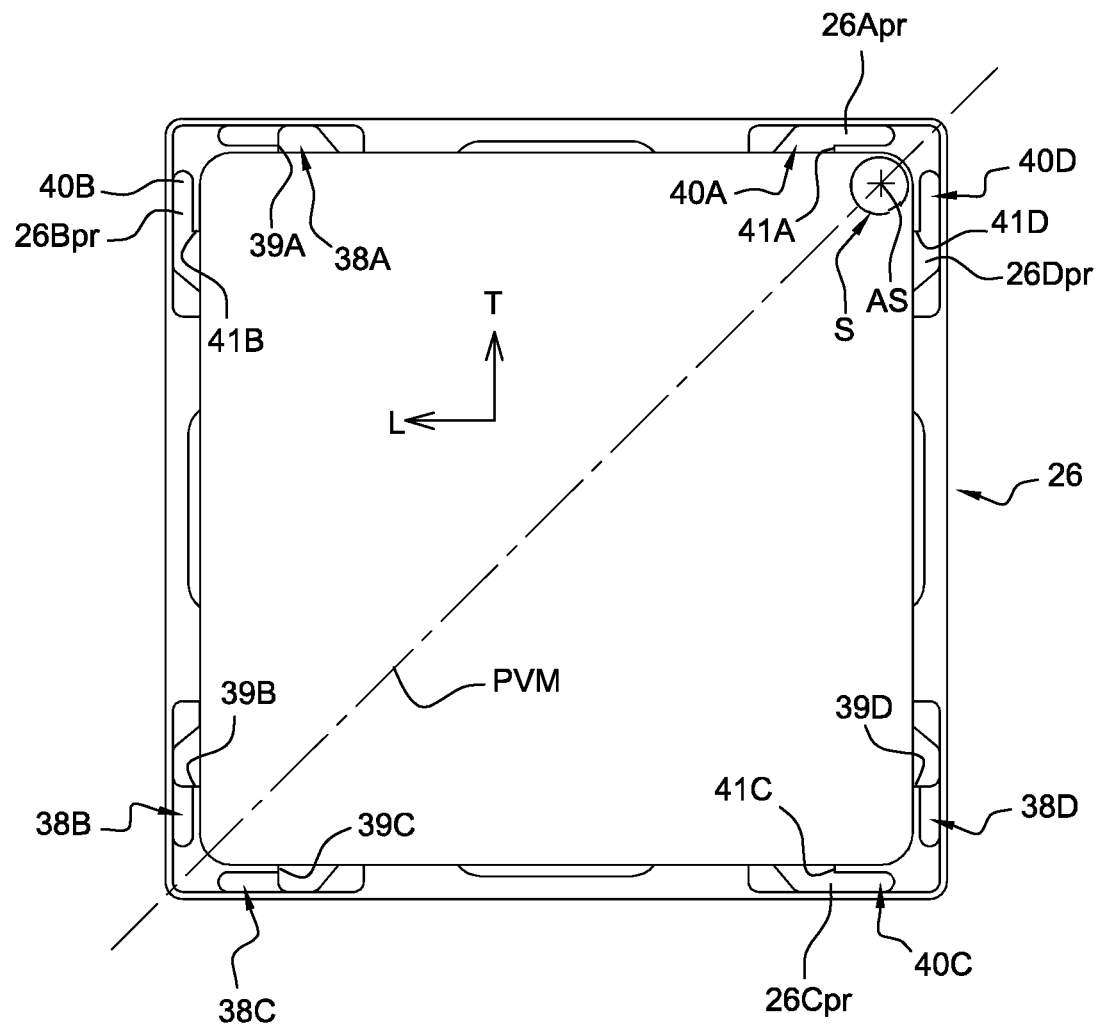
FIG. 8 is a view similar to that of FIG. 7, again showing some example components of the device.
Figure 9:
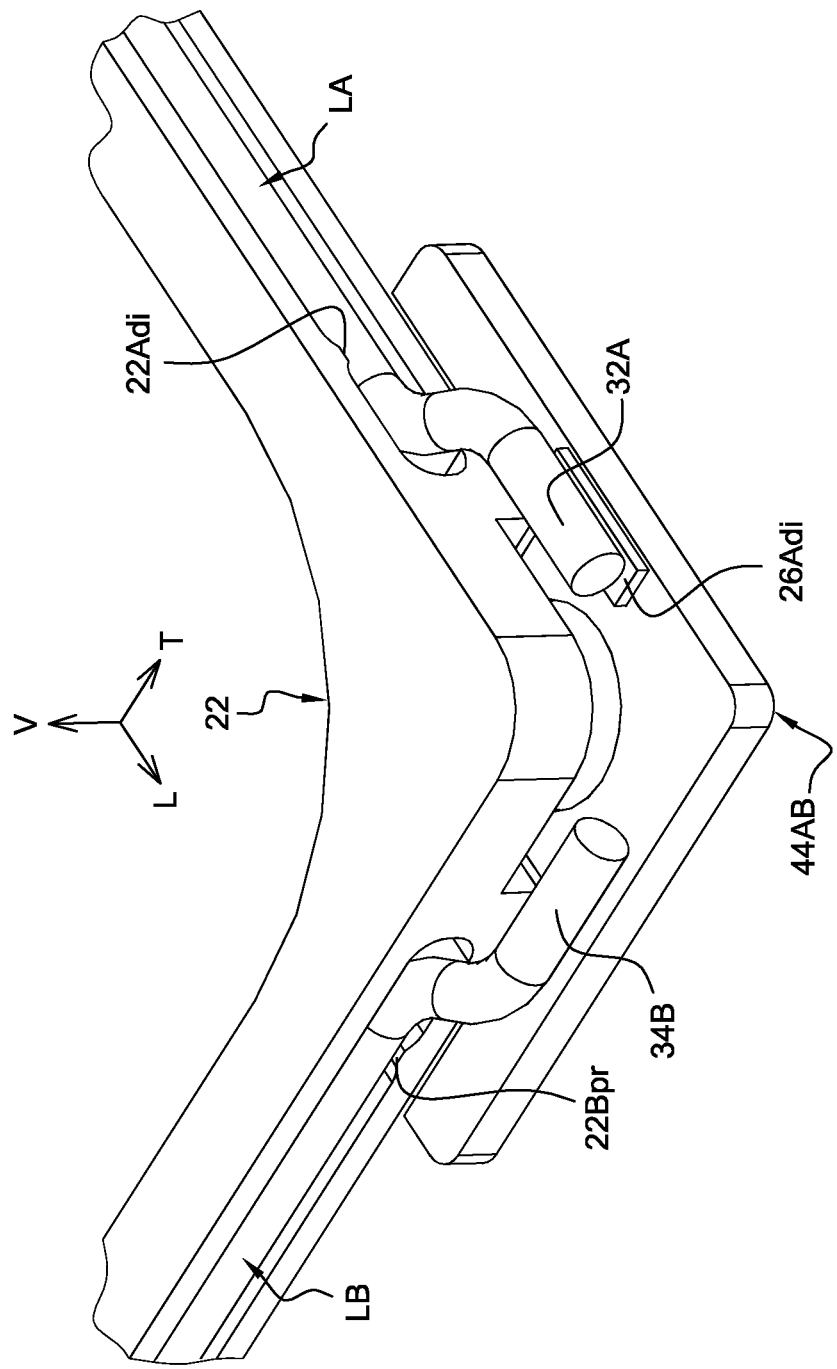
FIGS. 9 to 12 are large-scale detail views showing, at the four corners in succession, example components of the device as they are arranged in FIG. 4.
Figure 10:
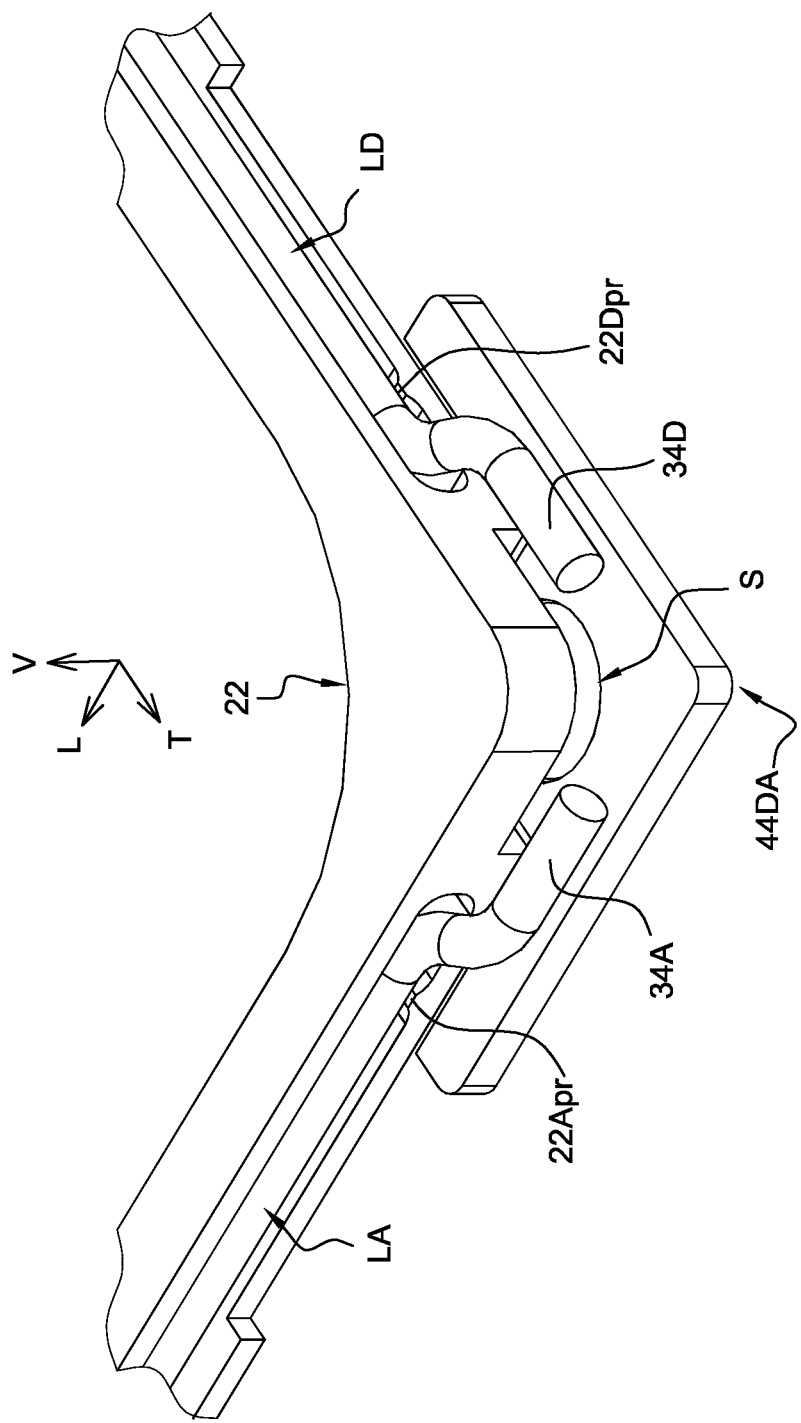
Figure 11:
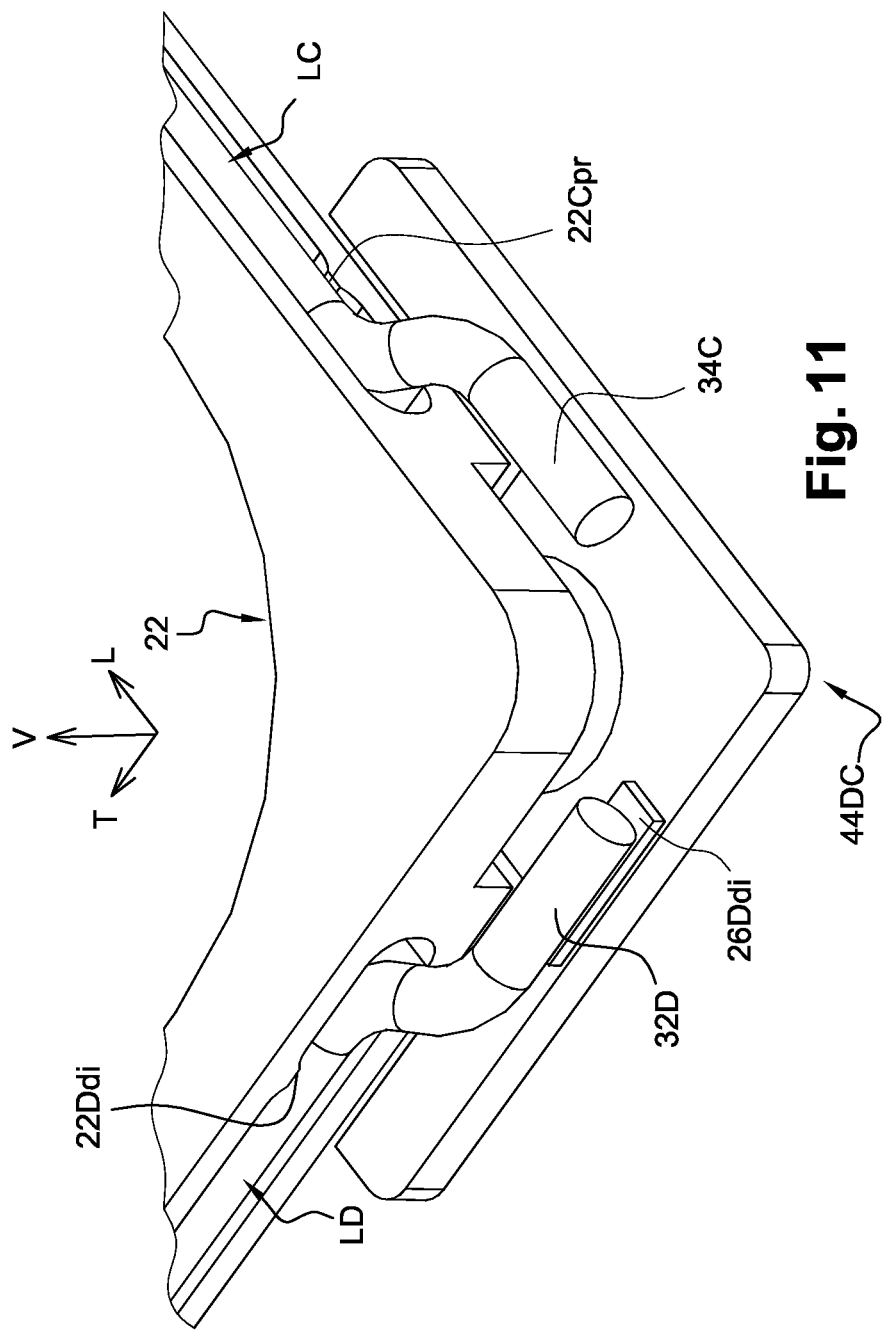
Figure 12:
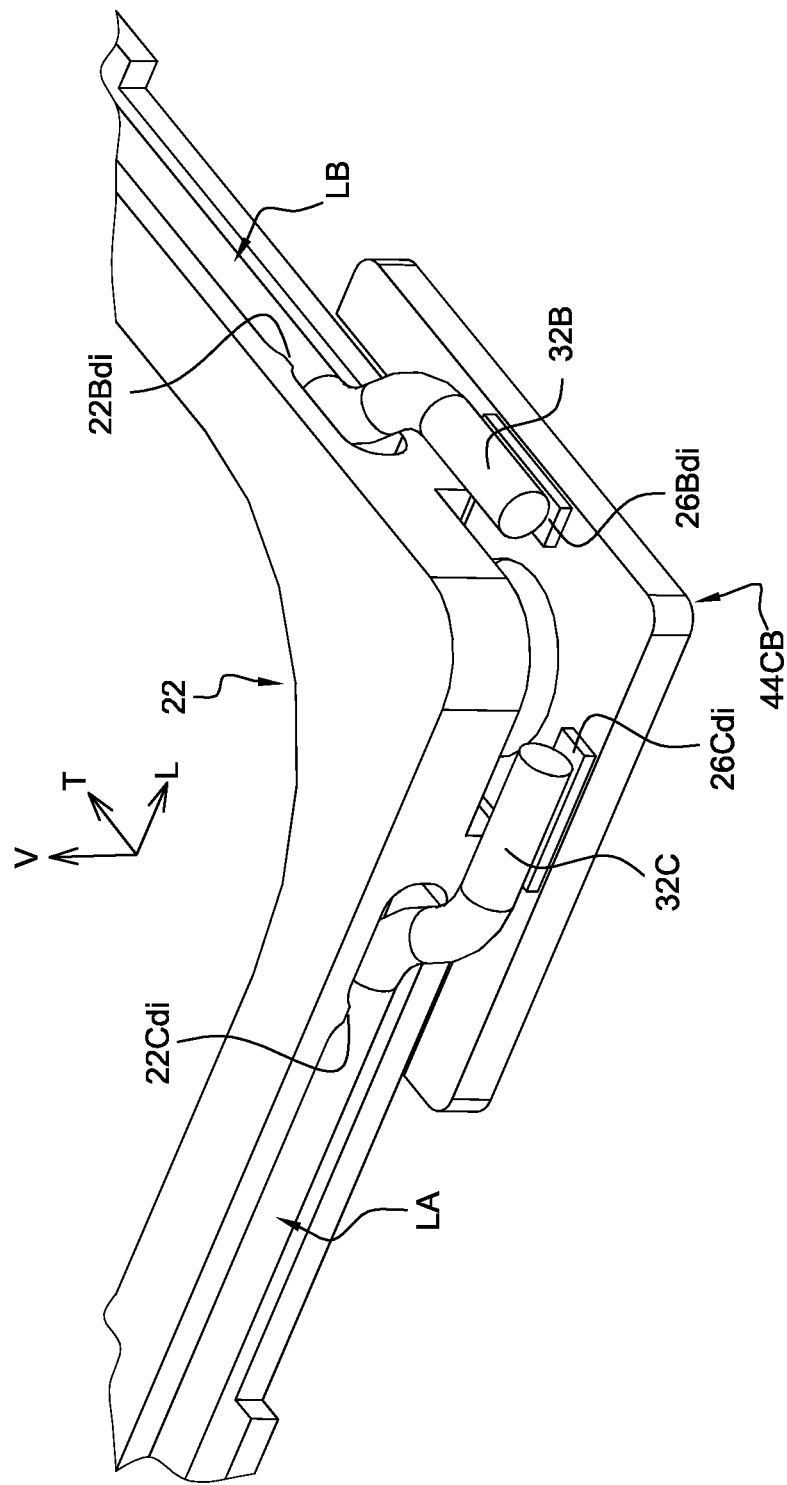
Figure 13:
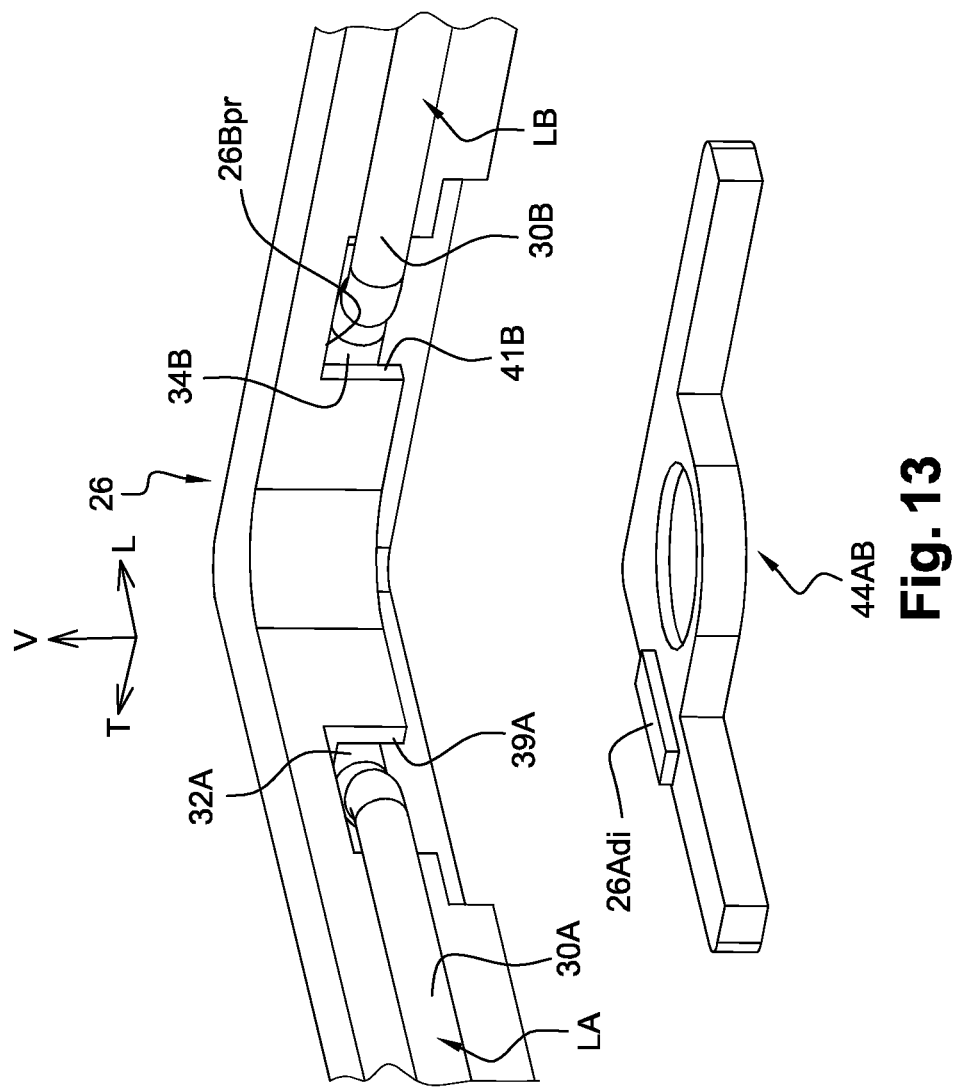

As can be seen in the figures, and notably in FIG. 7, the switch S is arranged geometrically in such a way that its vertical axis of actuation AS is placed on the periphery of the contour 27 of the upper panel 23s.

Figure 15:
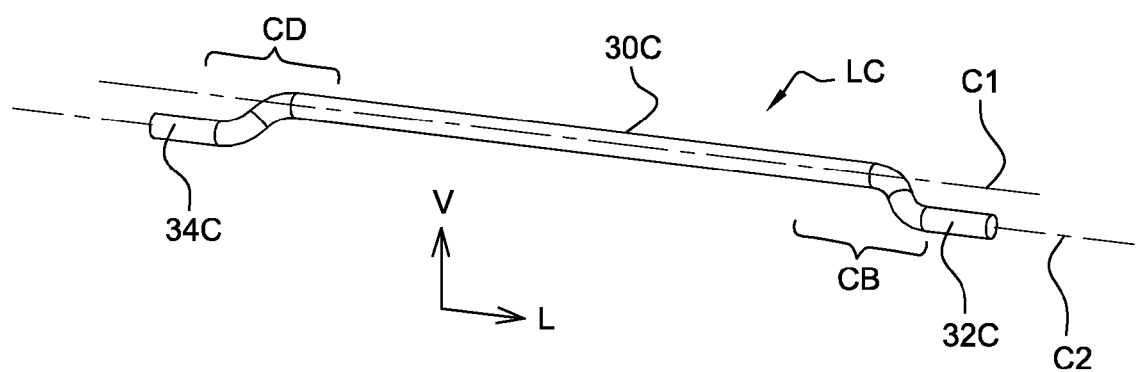
FIG. 15 is a large-scale view of one of the shafts of the device shown in FIG. 1.
Figure 2:
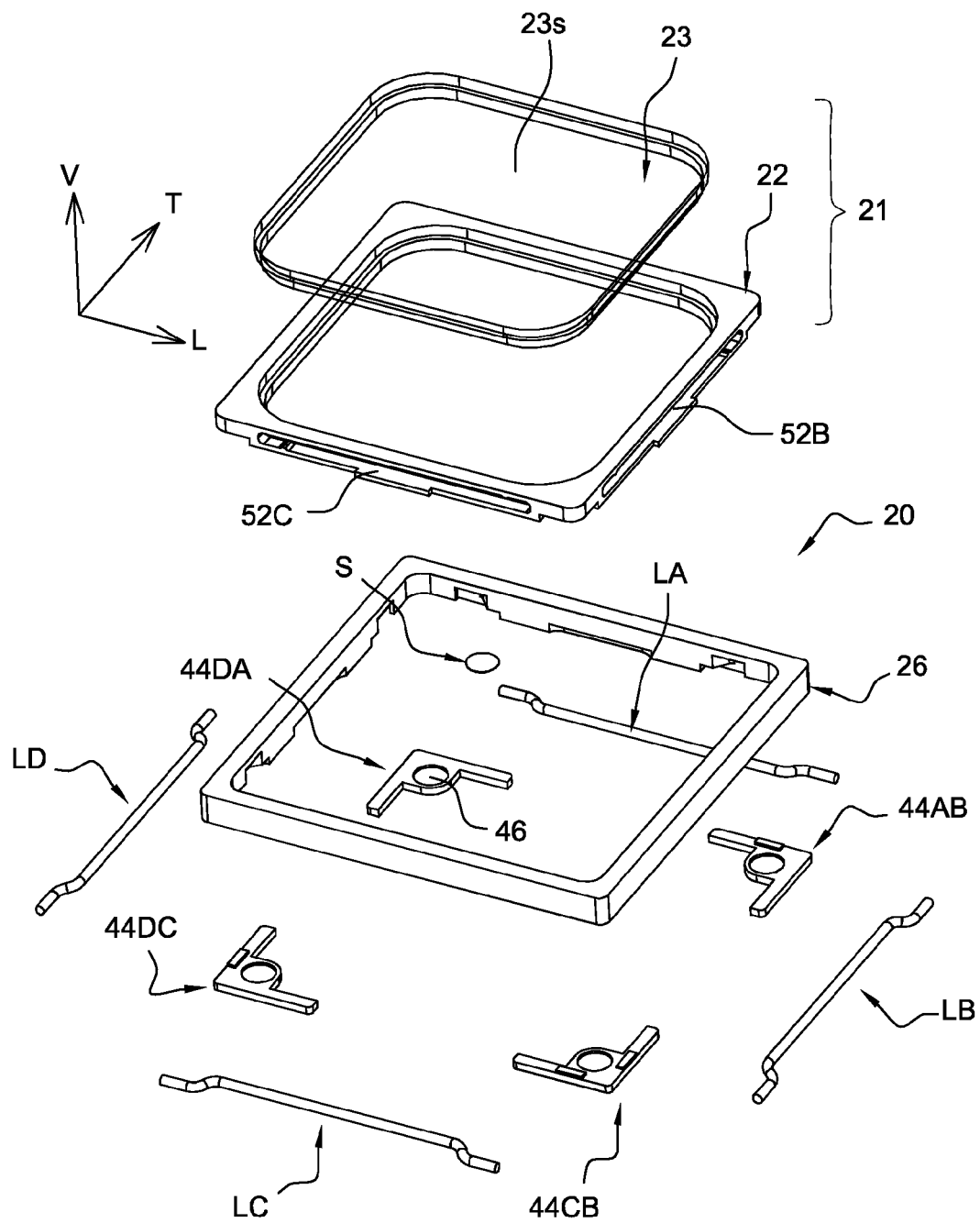
FIG. 2 is an exploded perspective view of the control device shown in FIG. 1.
Figure 3:
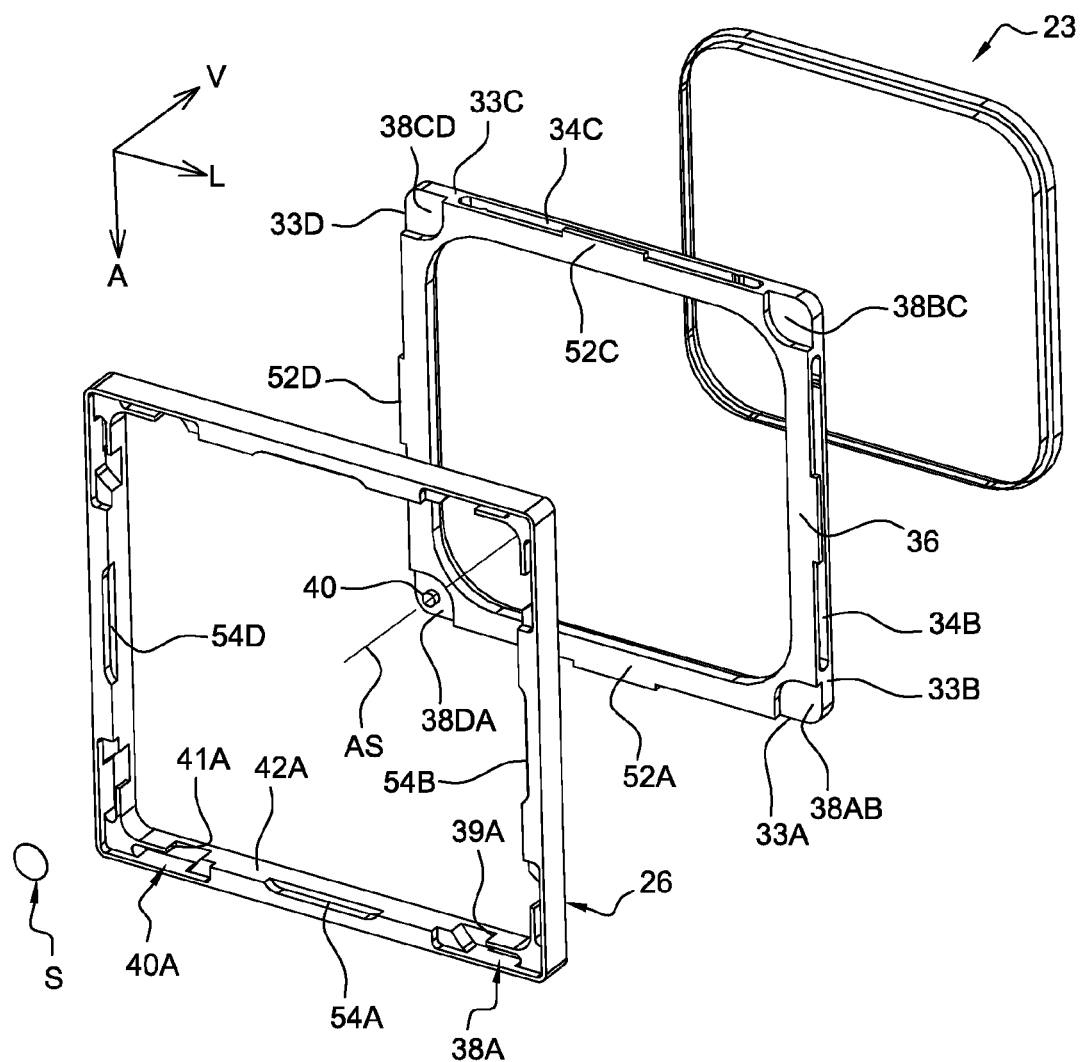
FIG. 3 is a view from another angle, of some of the example components shown in FIG. 2.
Figure 4:
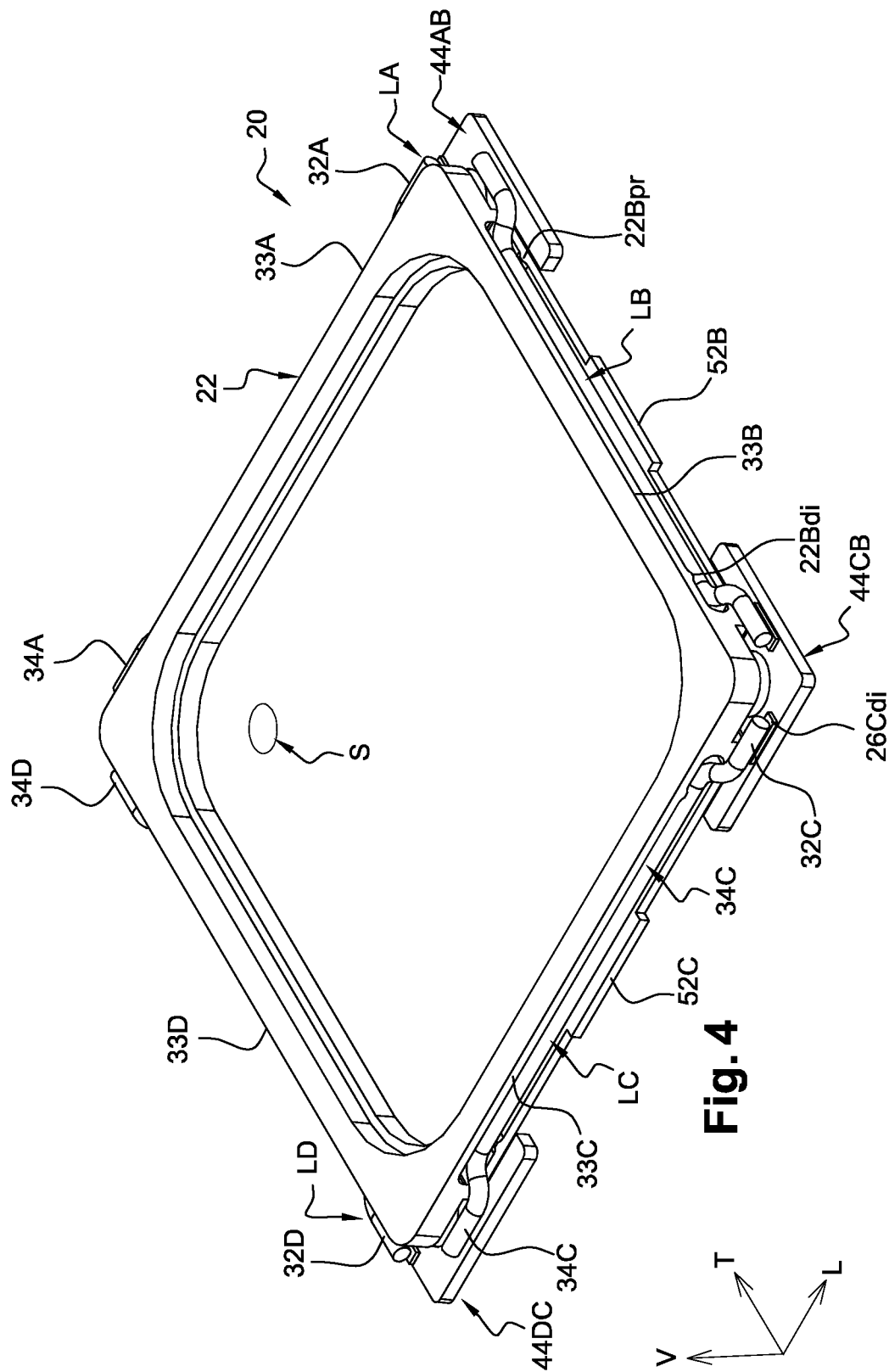
FIG. 4 is a view on a larger scale of some example components of the device shown in FIG. 1.
Figure 5:
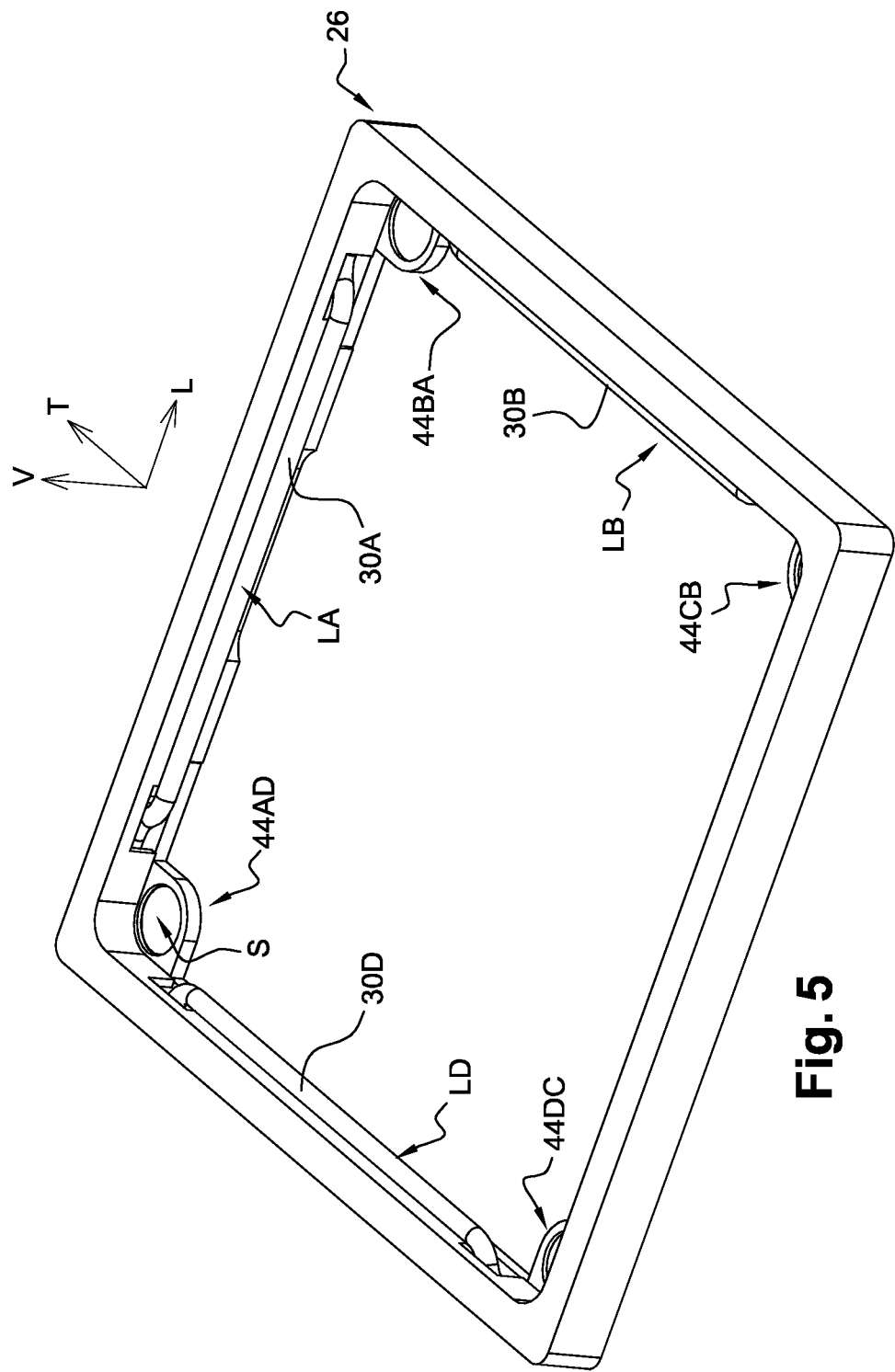
FIG. 5 is a view similar to that of FIG. 4, showing some example components of the device of FIG. 1.
Figure 6:
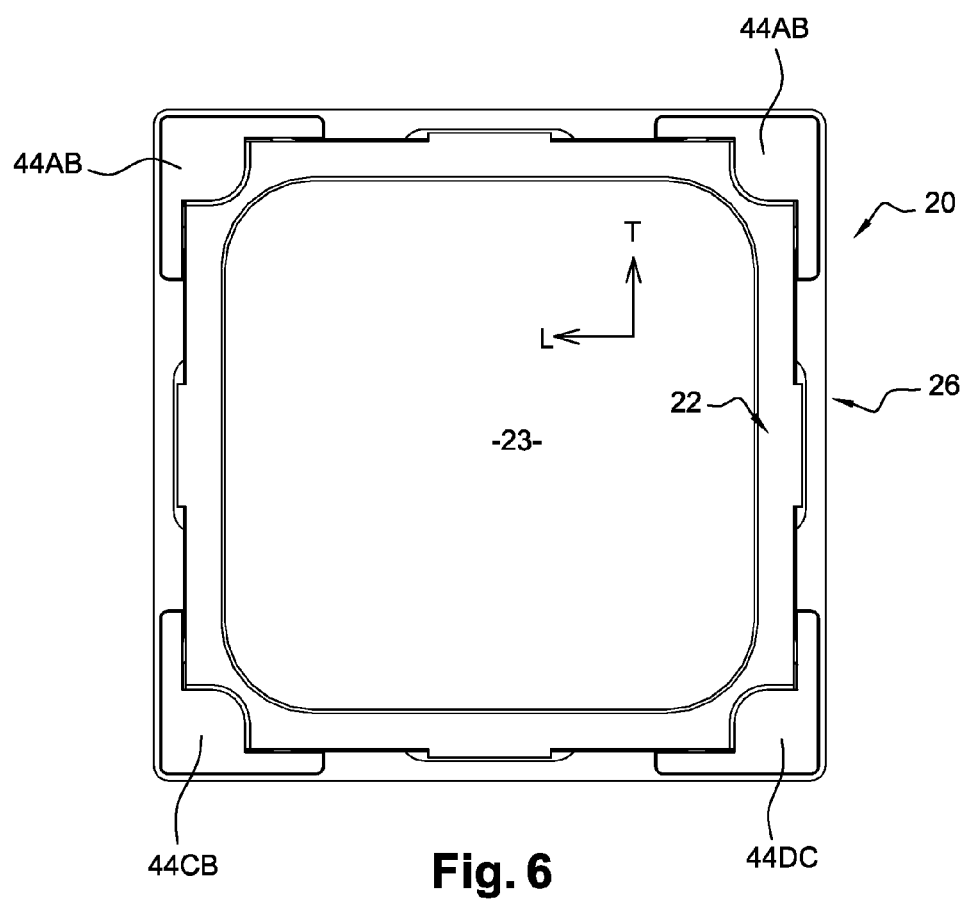
FIG. 6 is a view from below of the device of FIG. 1.

Reference will now be made to FIG. 15, in which the shaft LC is shown by way of example. Given that the four shafts are of identical design, this shaft will now be described in detail.

Each shaft is, for example, an element made of metal wire.

The shaft LC has a generally rectilinear orientation and includes a rectilinear central part 30C extending along a first geometric axis C1.

The shaft LC also includes a distal end part 32C and a proximal end part 34C.

The two end parts 32C and 34C are rectilinear and parallel to the central part 30C. Each of these end parts 32C and 34C is connected to a corresponding end of the central part 30C by an S-shaped connecting portion. The two end parts 32C and 34C are thus offset laterally from the central part 30C.

The two end parts 32C and 34C are aligned with one another; that is to say, they are coaxial with a second geometric axis C2 which is parallel to the first geometric axis C1.

The distal end part 32C belongs to the distal end portion CB of the shaft LC, while the proximal end part 34C belongs to the proximal end portion CD of the shaft LC.

As explained below, the shaft LC is mounted rotatably relative to the frame 22 of the upper panel 21 about the geometric axis C1 and it is mounted rotatably relative to the lower mounting 26 about the geometric axis C2.

The frame 22 of the upper panel 21 has, in each of its outer vertical lateral faces 33A, 33B, 33C and 33D, a cut-out in the form of an open horizontal groove, each of which is adapted to receive the central part 30A, 30B, 30C and 30D of the associated shaft.

Each groove 34A, 34B, 34C and 34D is delimited by two facing upper and lower horizontal faces, each of which has, near one of its ends, a relief or projecting stud forming a bearing point for the facing portion of the central part of the associated shaft.

Each groove or housing this has an "upper" contact point 22Bdi, 22Adi, 22Ddi, and 22Cdi at its distal end and a "lower" contact point 22Apr, 22Bpr, 22Cpr and 22Dpr at its proximal end, with each of which the associated shaft interacts with its central part.

Figure 18:
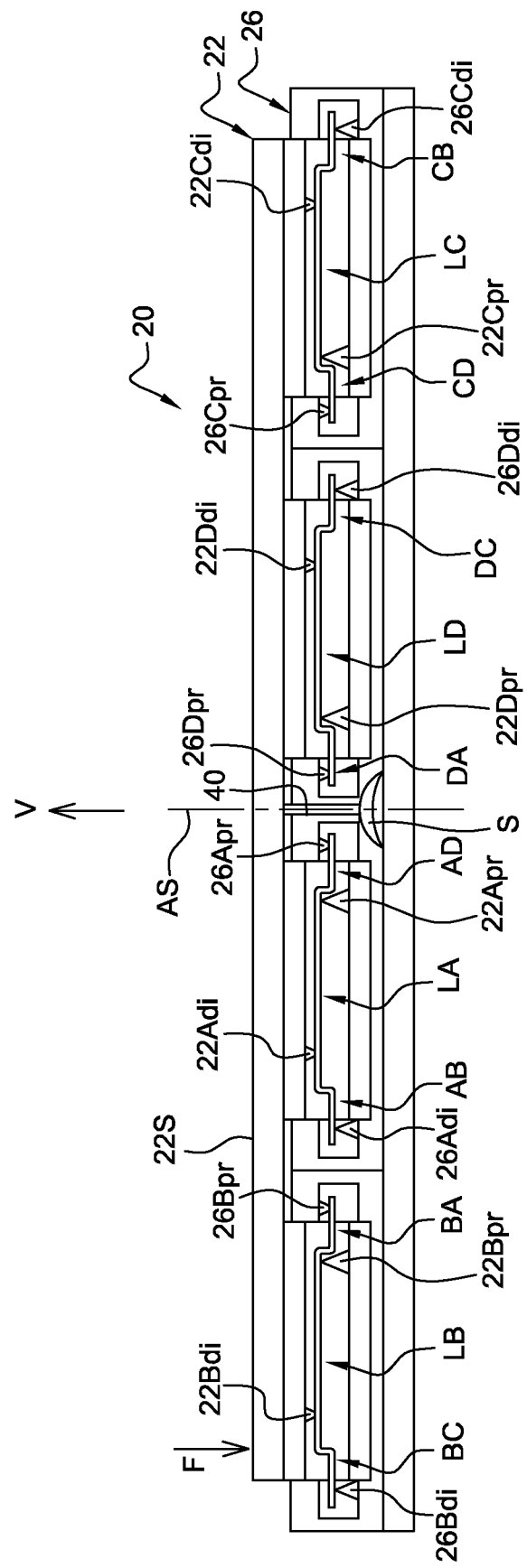
FIG. 18 is a schematic view of the device shown in FIG. 1, provided to explain the operation of the device.

The arrangement and position of these contact points belonging to the frame 22 are shown in detail in FIG. 18.

In its horizontal inner face 36, the frame 22 of the upper panel 21 has, at each of its corners, a recess 38AB, 38BC, 38CD and 38DA.

In the recess 38DA, the frame 22 has a pin 40 for actuating the switch S, extending vertically downwards along the axis AS of actuation of the switch S. The lower free end of the pin 40 interacts with the convex upper face of the dome forming the switch S.

Similarly, the lower mounting in the form of a frame 26 has, in each of its sides or uprights, two recesses, each placed near one end, and each adapted to receive the associated end part of a shaft.

Thus, for example, the side "A" of the lower mounting 26 has two housings 38A, 40A, each of which receives the associated end part 32A, 34A of the shaft LA.

Each housing 38A, 40A thus takes the form of a longitudinal groove, and the inner vertical lateral face 42A, 42B, 42C and 42D of the frame has two openings or apertures, allowing the free passage of the S-bend which connects the associated end part of each shaft with the central part.

For example, the face 42A has two openings 41A and 39A.

To allow the assembly of the components and notably the fitting of the end parts of the shafts in their respective housings, each housing 38A, 40A is open vertically downwards and is subsequently closed by a cover of complementary shape 44AB, 44CB, 44DC and 44DA in the shape of a letter L with two branches.

The dome of the switch S is received in a complementary housing 46 formed in the upper face of the cover 44DA which, in the assembled position, is at right angles to the actuating pin 40 of the frame 22 of the upper panel 21.

To provide "lower" contact points 26Bdi, 26Adi, 26Ddi, and 26Cdi for the facing distal end parts of the shafts, the upper faces of the covers have vertically upward pointing relief, or projecting, studs, which interact with the facing portions of the distal end parts.

These various studs are shown in detail in the figures, notably in FIG. 18.

Thus the lower mounting has four "distal" contact points.

Similarly, in some of the housings the upper face also has a vertically downward pointing relief or projecting stud, to form an "upper" contact point 26Apr, 26Bpr, 26Cpr and 26Dpr, interacting with a facing proximal portion of the central part of the associated shaft.

The upper contact points belonging to the lower mounting are illustrated and referenced in detail in FIG. 18.

In this embodiment, in a non-limiting way, for each shaft LA, LB, LC, LD its two contact points, distal and proximal, with the upper panel are arranged longitudinally between its two distal and proximal contact points with the lower mounting. In other words, the two points of a pair of contact points, being proximal and distal points respectively, are offset longitudinally from one another.

As can be seen in the figures, the upper panel has four positioning and stop lugs 52A, 52B, 52C and 52D, each of which is received in a corresponding indentation 54A, 54B, 54C and 54D formed in a facing position in the lower mounting 26. The four lugs form four stops which determine the upper rest position of the upper panel relative to the lower mounting.

In the assembled position of the components, each shaft is preferably fitted without play between its various contact points arranged in the lower mounting 26 and in the frame 22 of the upper panel 21.

In the detailed description provided above, the first embodiment of the control device has a general symmetry of design with respect to the median vertical plane PVM which extends along a diagonal and passes through the vertical axis AS of actuation of the switch S.

The operating principle of the first embodiment of the device will now be described, notably with reference to FIGS. 16 to 18.

When a control force F is applied to the upper face of the upper panel, regardless of the geographical position of the point of application of this control force on this surface, the articulated structure formed by the four shafts transmits the movement and the forces from one corner to another until the switch S located at one of the corners is reached.

Transmission is always in the same direction as indicated by the arrows FB, FC, FA and FD, that is to say from the distal end of each shaft towards its proximal end.

Thus any rocking of the upper panel is prevented; that is to say, the upper panel remains virtually perfectly horizontal or parallel to itself during the actuation for the purpose of causing the triggering of the switch.

Figure 16:
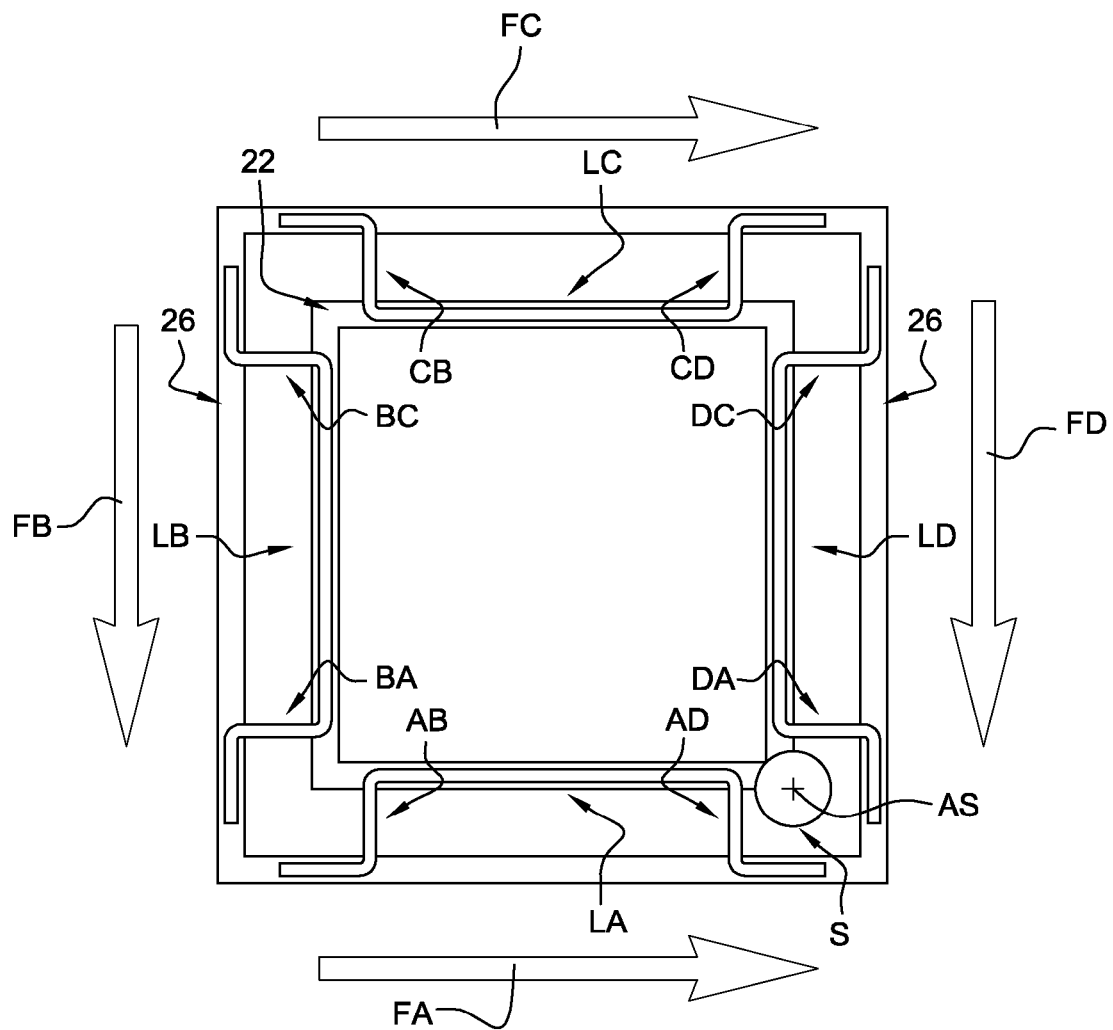
FIG. 16 is a schematic representation of the main components of the device of FIG. 1, provided to explain the operation of the device.

When the force applied to the upper panel is relaxed, the force is applied in the opposite direction to that indicated by the arrows shown, notably, in FIG. 16.

Figure 17:
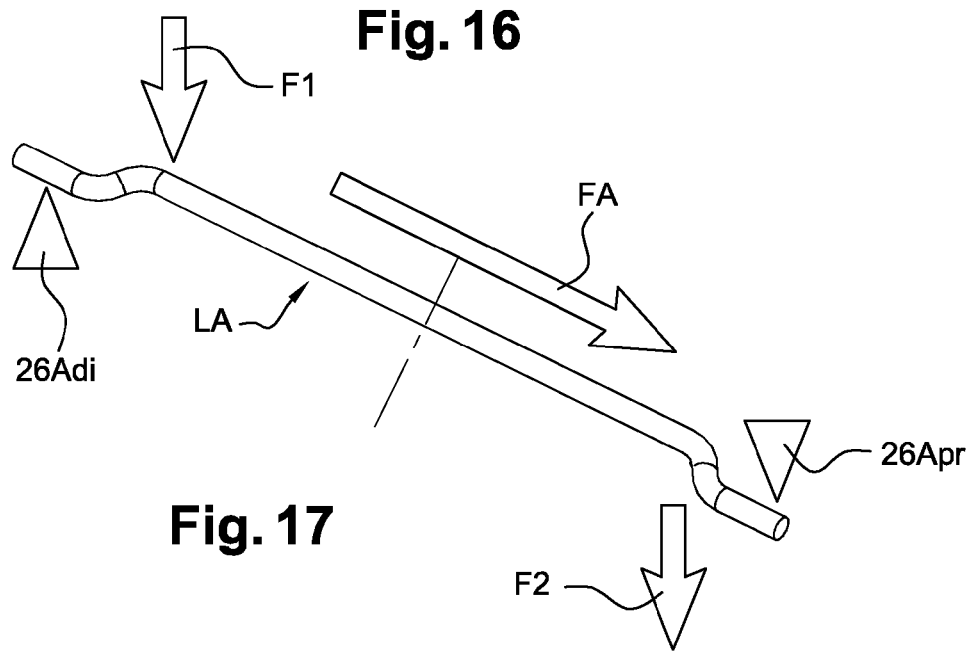
FIG. 17 is a diagram illustrating the operation of a shaft of the device according to an embodiment.

With reference to FIG. 17, during actuation, that is to say when a force F is applied to the upper panel (see FIG. 18), a force F1 is applied by the upper panel to the lever LA, while a reaction force is applied by the contact point 26Adi.

The force is transmitted as shown by the arrow FA, and a force F2 equal to the force F1 is applied by the other (proximal) end of the shaft LA to the other end of the upper panel along the side A with the associated reaction contact point 26Apr.

In order to ensure that the transmission of the forces and the rotations of the levers about their axes "1" and "2" always take place in the same direction, the axis of actuation AS of the switch S may be positioned substantially tangentially to the contour of the actuation surface 23s accessible to the user.

In the embodiment described above, the axis AS is located at the corner AD which is substantially tangential to the corner of the surface 23s.

This arrangement, with its articulated structure, not only ensures that the upper panel remains horizontal and parallel to itself, but also provides an equality of sensation of actuating force and tactile sensation during the triggering of the switch, regardless of the position of the actuating point on the upper actuating surface.

The dome of the switch is shown as bearing downwards on a facing portion of the lower mounting 26 and with an actuating pin 40 belonging to the upper panel 21.

Clearly, an inverted mechanical arrangement is possible, with the dome "upside down", in which case it would bear against a facing portion of the lower face of the upper panel 21, with the actuating pin belonging to the lower mounting 26.

The method according to an embodiment will now be described with reference to FIG. 19 and the following figures, which include schematic representations of a control device with an articulated structure in which the shaft or shafts of the articulated structure act directly on the switch, that is to say a control device of the type described and illustrated in FR-A1-2 947 645.

Figure 19:
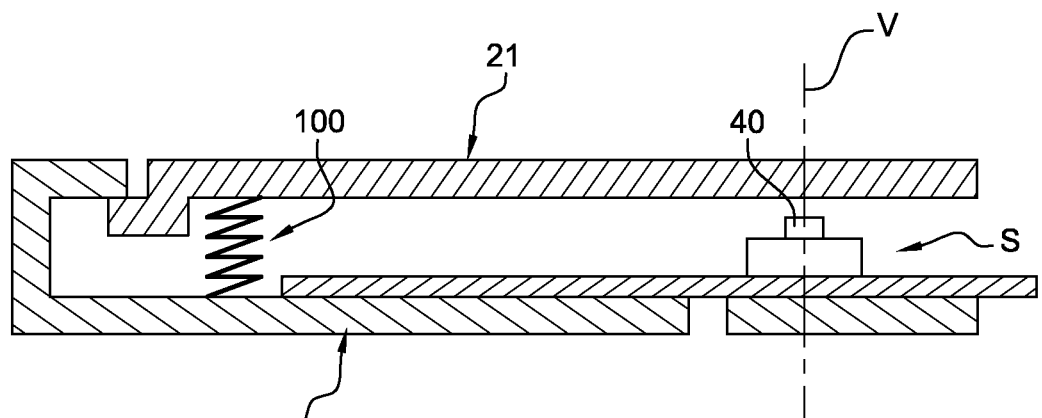
FIG. 19 is a schematic representation, in a cross section along a vertical plane, of a control device having a spring compensating for the assembly play.

FIG. 19 shows an assembly, without an articulated structure in this case, in which the play is taken up in the vertical direction V by means of a spring 100 which is interposed vertically and mounted in a compressed state between two facing portions of the upper panel 21 and the lower mounting 26.

Figure 20:
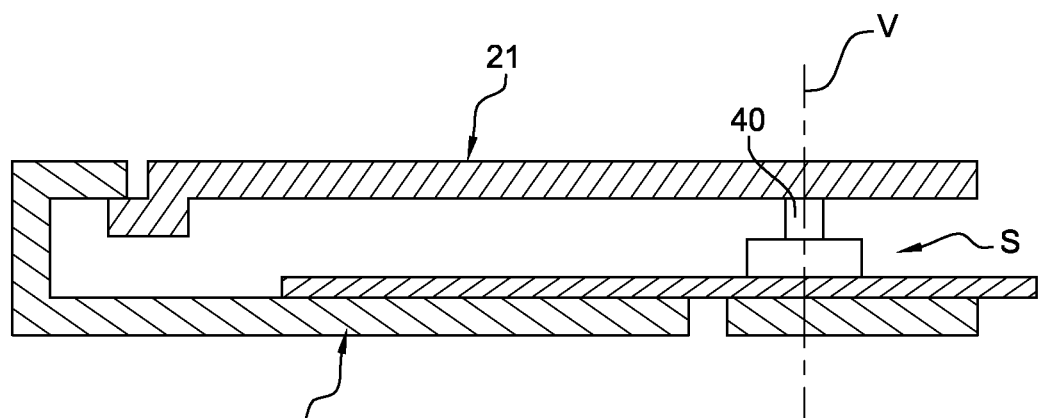
FIG. 20 is a schematic representation of a control device in which the switch serves as a spring for taking up the assembly play.

In FIG. 20, it is the switch S itself that acts as a spring for taking up the play by means of its actuating pin 40, which is biased in a known way by an internal compression spring, in order to hold the upper panel 21 in the high position and without any play in the vertical downward direction for its user.

Figure 21:
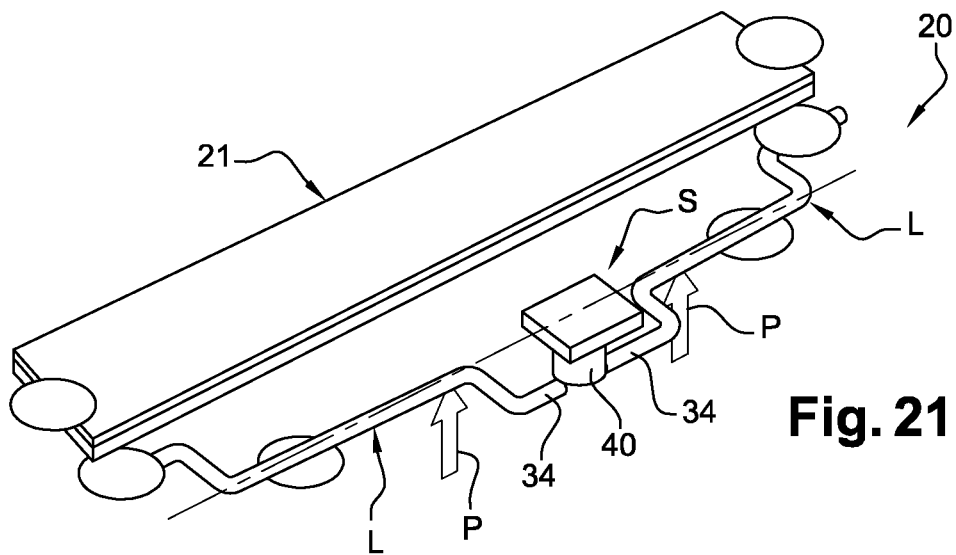
FIG. 21 is a schematic perspective representation of a control device having, notably, two shafts acting on the switch.

FIG. 21 shows schematically an assembly having an upper actuating panel 21 and two shafts L of an articulated structure, each of which has a proximal end portion 34, relative to the switch S, which can act on the actuating pin 40 of the switch S.

The circles in FIG. 1 show schematically different bearing and contact points for the upper panel 21 and for different parts or portions of the shafts L.

Figure 22:
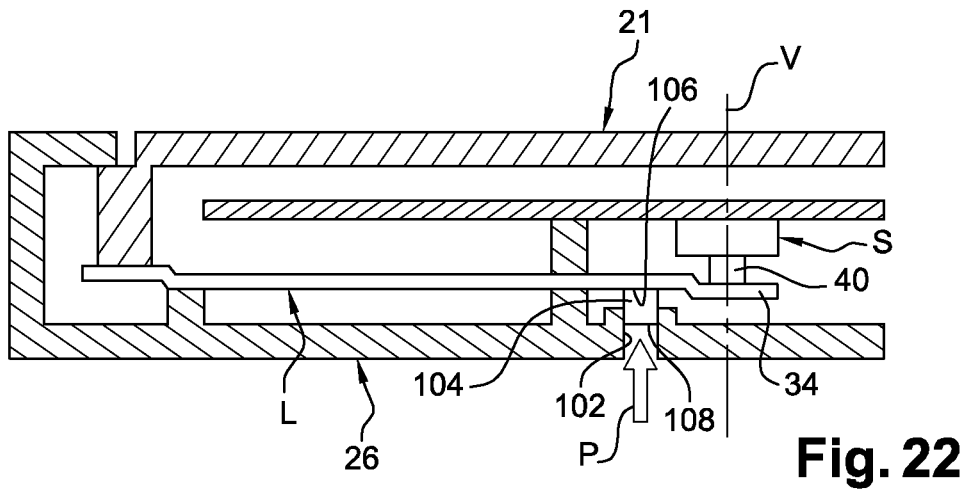
FIG. 22 is a schematic representation, in a cross section along a vertical plane, showing one of the arms of FIG. 21 and illustrating the application of the preload at a point of this shaft.
Figure 23:
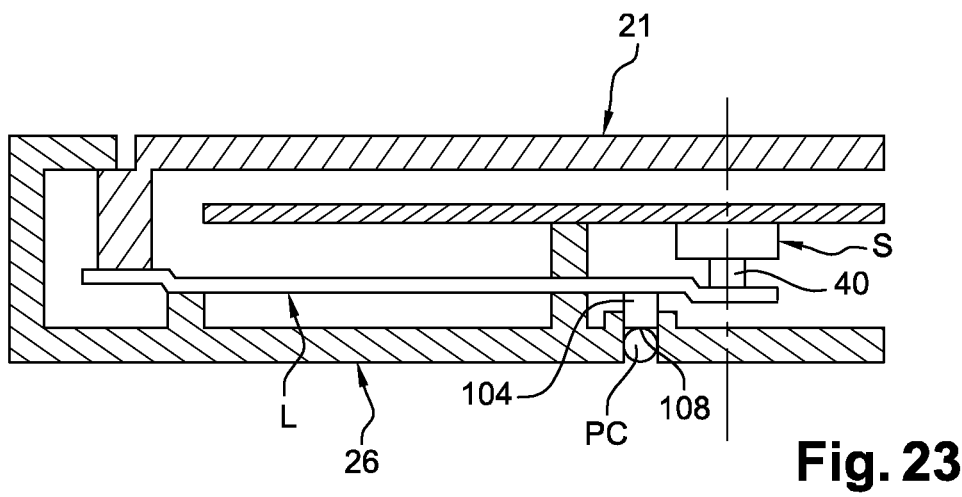
FIG. 23 is a view similar to FIG. 22, showing the arm after the initial adjustment and the provision of the fixed stop.

FIGS. 22 and 23 show a first embodiment of the method of initial adjustment of the control device 20, relating in this case to one of the two arms L.

To this end, the lower mounting 26 has a cylindrical hole 102 with a vertical axis V which receives, by axial sliding in the vertical direction, a stop pin 104.

The stop pin 104 is delimited by its upper or front end face 106 and by its opposed lower or rear end face 108.

After the assembly of the various components of the control device 20, a preload force P having a predetermined value is applied to each shaft L in a vertical direction which is upwards in this case.

The application of the preload having a predetermined value makes it possible to take up all the assembly play, and the next step of the method comprises providing, in this position under a preload, an adjustment stop which is fixed relative to the lower mounting 26.

In this example, the adjustment stop is formed by the pin 104 whose front end face 106 bears vertically without play against a facing portion of the shaft L.

In order to fix or immobilize the stop pin 104 in its hole 102 relative to the lower mounting 26, while maintaining the preload P, a plug of adhesive or resin PC is deposited in the hole 102, behind the pin 104, in contact with the rear end face 108 of the pin 104.

The adhesive plug PC is then hardened or cured and adheres to the wall of the hole 102, blocking or immobilizing the stop pin 104.

The drying, hardening or curing of the adhesive plug PC should preferably be carried out very quickly.

According to one method, the adhesive may be what is known as "UV adhesive", that is to say an adhesive which is dried or cured virtually instantaneously by means of a stream of ultraviolet rays to which the adhesive plug PC is subjected.

After the stop pin 104 has been blocked or immobilized by the adhesive plug PC, the preload P is removed.

The device 20 is thus in an assembled and adjusted state without any play.

Figure 24:
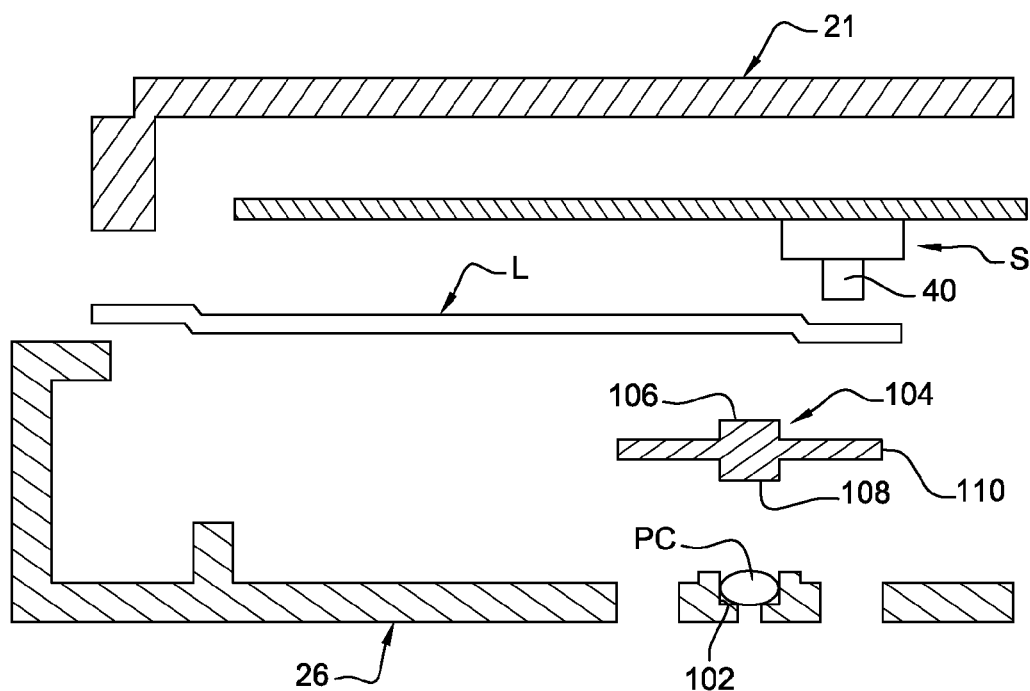
FIG. 24 is an exploded view of the various example components of a variant embodiment of an assembly of the type shown in FIGS. 21 and 22.
Figure 25:
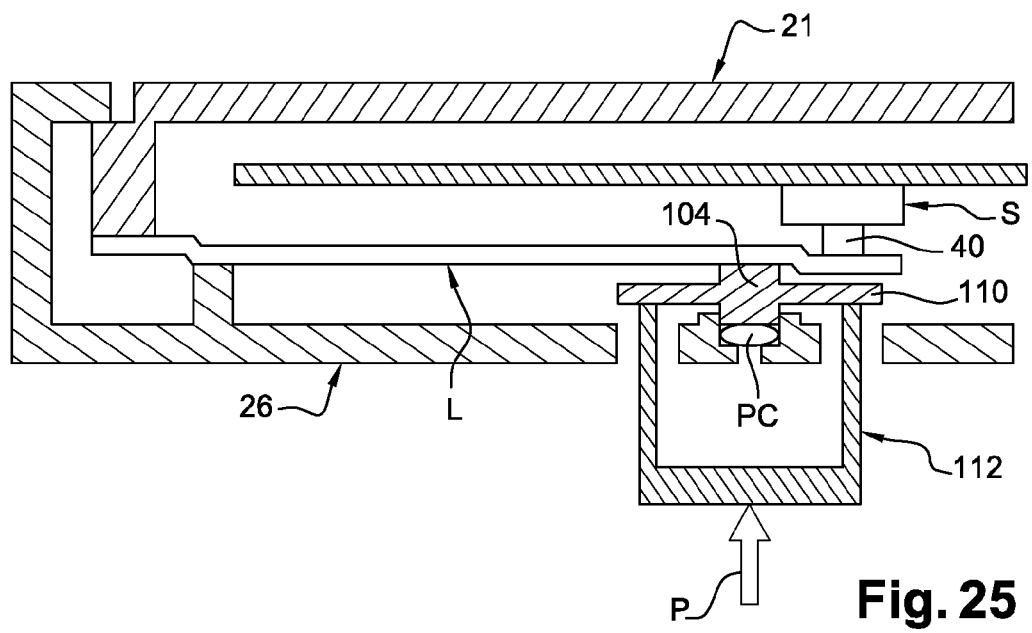
FIG. 25 is a view of the device of FIG. 24 in the assembled position and during adjustment.

In FIGS. 24 and 25, the stop pin 104 has a disc-shaped peripheral fin 110 which allows the preloading force P to be applied to it at a plurality of points by means of a load application structure 112.

The adhesive plug PC can be positioned in the lower base of the hole 102 and the lower portion of the stop pin 104 is then introduced into the open upper end of the hole 102, the other steps of the method being similar to those described above.

The method can be used to provide an initial adjustment method for taking up the various areas of play resulting from the design, manufacture and assembly of the various components.

When the device is used, operating play may appear as a result of phenomena of wear and/or expansion.

To provide further compensation for this play, called the play due to use, a spring 100 for taking up the play can be interposed vertically between the stop pin 104 and the facing portion of the shaft L.

Figure 26:
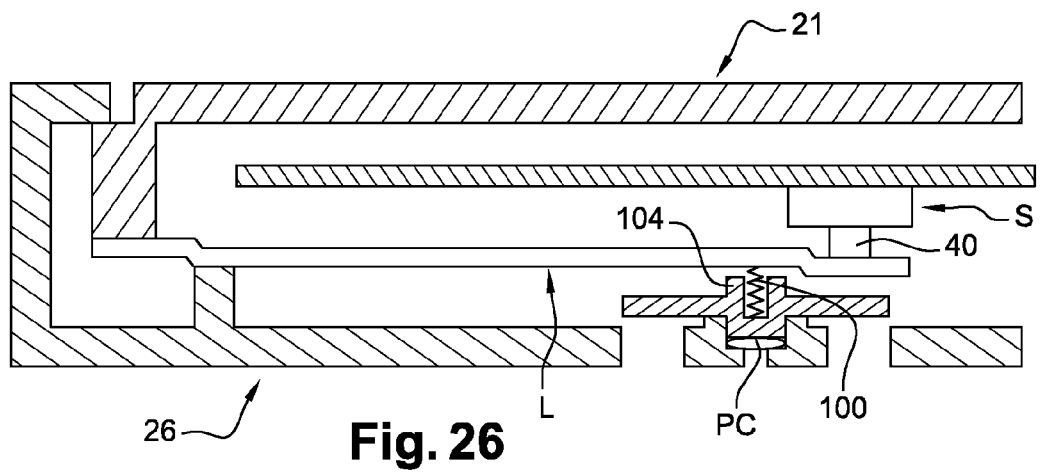
FIG. 26 is a view similar to FIG. 23, showing a variant embodiment of the fixed adjustment stop, incorporating a spring for taking up the play.
Figure 27:
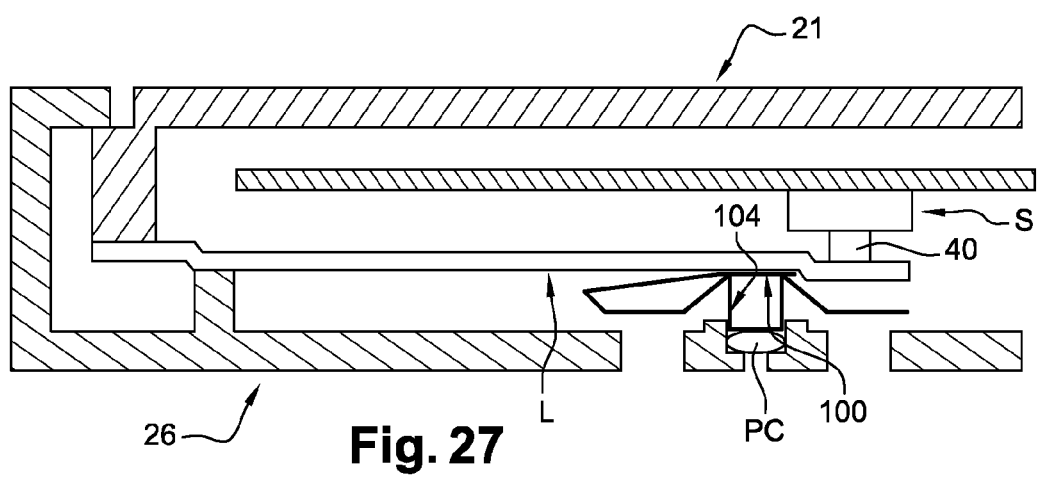
FIG. 27 is a view similar to FIG. 23, showing another variant embodiment of the fixed adjustment stop incorporating another type of means for taking up the play.
Figure 28:
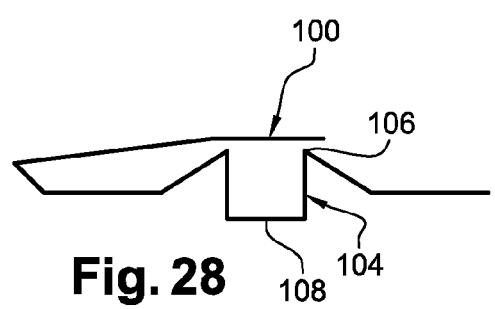
FIG. 28 is a detail view showing the spring for taking up the play of FIG. 27 in its free state.

In FIG. 26, the spring 100 for taking up the play is shown in the form of a compression coil spring, while, in FIGS. 27 and 28, the spring 100 is formed by an upper, elastically deformable strip made in one piece with the pin-shaped stop element 104.

In FIGS. 27 and 28, when the initial adjustment method is applied, the front end face 106 of the stop pin 104 is formed by at least two bearing points which are in indirect contact with the facing portion of the shaft L, with the interposition of a portion of the strip 100 which subsequently forms the spring 100 for taking up the play.

In FIG. 29, the longitudinal frame, which is used to illustrate another example of the application of the adjustment method serves as the lower mounting 26.

In this case, the stop element used in the initial adjustment method is an element in the form of a horizontal plate 104, shown in detail in FIG. 30, which incorporates a strip forming a spring 100 for taking up the play, similar to that shown in FIGS. 27 and 28.

Figure 32:
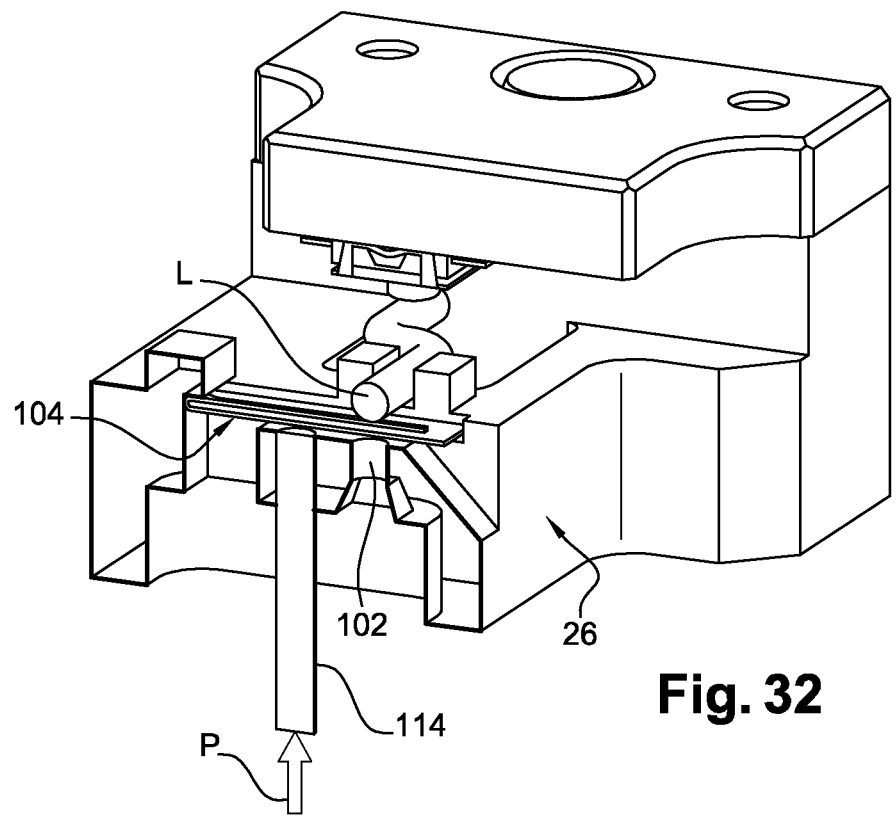
FIG. 32 is a larger-scale view in cross section taken along a transverse vertical plane of FIG. 29, before the provision of the fixed adjustment stop.
Figure 33:
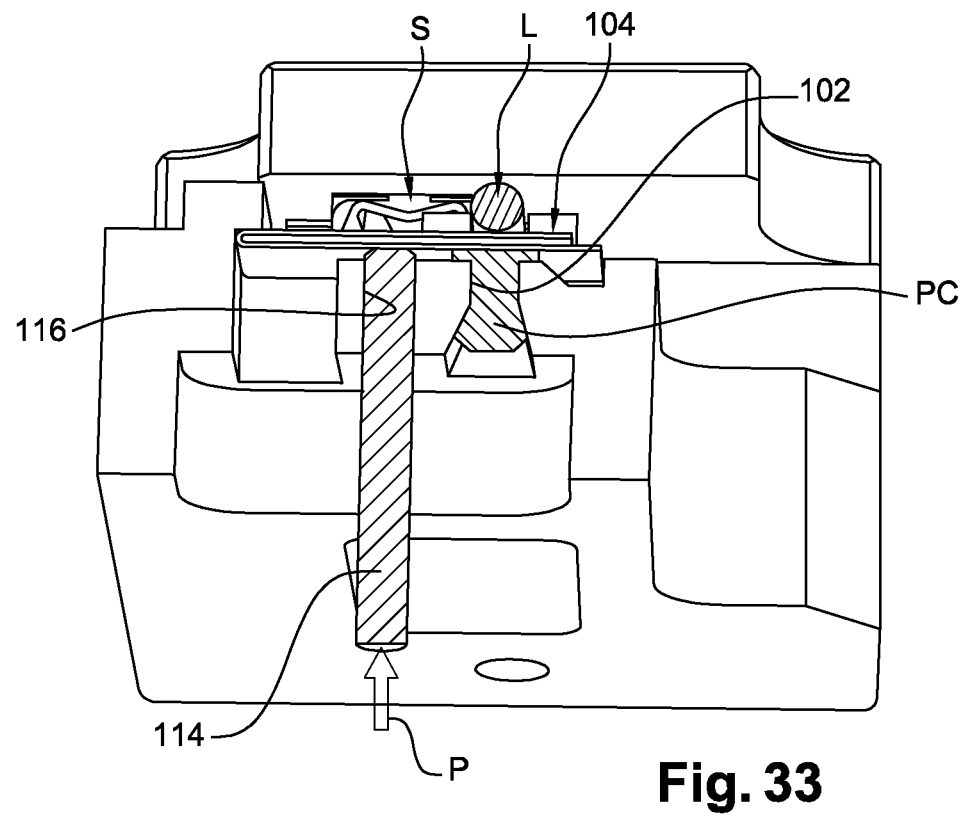
FIG. 33 is a view similar to FIG. 32, after the provision of the fixed adjustment stop.

As can be seen in FIGS. 32 and 33, the lower mounting 26 in this case has a vertical bore 116 in which a preloading pin 114 is slidably fitted, the upper free end of this pin acting on the upper face of the stop element 104 to bring it into contact with the facing portion of the shaft L, with the interposition of the strip 100 in the compressed position.

While the preload P is maintained, the adjustment stop element 104 is immobilized in a fixed position relative to the lower mounting 26 by the introduction of a plug of adhesive PC into the hole 102, after which the adhesive is hardened so that it locks the stop element 104 in its adjusted position under the preload.

The application of the preload P can then be discontinued and the removable pin 114 can be extracted.

In a variant which is not shown, the fixed stop can be provided without the use of a stop pin or element as such, the stop being formed by the plug of adhesive itself, a portion of the front end of which is brought into contact with the facing portion of the shaft L.

To avoid any phenomenon of blocking due to the adhesion of this facing portion of the shaft L to the plug of adhesive PC, this facing portion may be coated in advance with a film of lubricant if necessary.

The solution shown in FIGS. 29 to 33, in which the stop element 104 is in the form of a plate, is solution that provides high stability of the stop element 104 during the application of the adjustment method.

The adjustment method can be applied independently and simultaneously to each shaft present in an articulated structure interposed between the upper panel 21 and the mounting 26.

This simultaneous adjustment method is applied without any parasitic mutual effects of each shaft on the adjustment of the other shafts, since the immobilization of the stop element or the provision of the stop element in the form of the plug of adhesive PC takes place simultaneously for all the shafts as a result of the hardening or curing of the adhesive points PC, followed by the removal of the preloads applied to each of the shafts.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method for adjustment of a control device for electronic equipment, comprising:
    applying a preload simultaneously to a plurality of shafts of a control device so as to take up initial assembly play, wherein the control device comprises:
       an upper actuating element having an upper actuating face, on which a user can exert at least one control action by applying a generally downwardly directed pressure to the upper actuating face,
       a lower supporting mounting, the upper actuating element being mounted so as to be movable relative to the lower supporting mounting by a vertical movement between an upper rest position, towards which the upper actuating element may be returned elastically, and an active lower position,
a switch which is actuated by the upper actuating element when the upper actuating element is in the active lower position, and
an articulated structure that is interposed vertically between the upper actuating element and the lower supporting mounting to keep the upper actuating element parallel to a horizontal plane during vertical downward movement of the upper actuating element relative to a frame, and that comprises at least one shaft;
providing an adjustment stop fixed relative to the lower supporting mounting and forming a stop surface which interacts with a facing portion of the at least one shaft by:
positioning a stop member relative to the lower supporting mounting in such a way that a front end of the stop member is in contact with the facing portion of the at least one shaft, wherein the stop member comprises a plug of adhesive or resin which is positioned in a hole in the lower supporting mounting and which has a front end in contact with the facing portion of the at least one shaft, and
immobilizing the stop member relative to the lower supporting mounting by causing the plug of adhesive to dry or causing the plug of resin to harden; and
removing the preload.

2. The method for adjustment according to claim 1, wherein:
the preload is applied by means of a removable preloading pin, which is guided in a vertical sliding movement relative to the lower supporting mounting.

3. The method for adjustment according to claim 1, further comprising:
coating the facing portion of the shaft with a film of lubricant.

4. A method for adjustment of a control device for electronic equipment, comprising:
applying a preload simultaneously to a plurality of shafts of a control device so as to take up initial assembly play, wherein the control device comprises:
an upper actuating element having an upper actuating face, on which a user can exert at least one control action by applying a generally downwardly directed pressure to the upper actuating face,
a lower supporting mounting, the upper actuating element being mounted so as to be movable relative to the lower supporting mounting by a vertical movement between an upper rest position, towards which the upper actuating element may be returned elastically, and an active lower position,
a switch which is actuated by the upper actuating element when the upper actuating element is in the active lower position, and
an articulated structure that is interposed vertically between the upper actuating element and the lower supporting mounting to keep the upper actuating element parallel to a horizontal plane during vertical downward movement of the upper actuating element relative to a frame, and that comprises at least one shaft;
providing an adjustment stop fixed relative to the lower supporting mounting and forming a stop surface which interacts with a facing portion of the at least one shaft by:
positioning a stop member relative to the lower supporting mounting in such a way that a front end of the stop member is in contact with the facing portion of the at least one shaft, wherein the stop member is interposed vertically between the facing portion of the at least one shaft and the lower supporting mounting, with a front end face in contact with the facing portion of the at least one shaft, and
immobilizing the stop member relative to the lower supporting mounting by positioning a plug of adhesive or resin between a rear end of the stop member and the lower supporting mounting, and causing the plug of adhesive to dry or causing the plug of resin to harden; and
removing the preload.

5. The method for adjustment according to claim 4, wherein:
the preload is applied by means of a removable preloading pin, which is guided in a vertical sliding movement relative to the lower supporting mounting.

6. The method for adjustment according to claim 4, wherein:
an elastically deformable member, forming a spring for taking up the play that develops during the use of the device, is interposed vertically between the front end of the stop pin and the facing portion of the at least one shaft.

7. The method of adjustment according to claim 4, wherein:
the stop member comprises a plug of adhesive or resin; and
the method further comprises drying or curing the adhesive or resin virtually instantaneously by means of a stream of ultraviolet rays to which the adhesive plug is subjected.

8. A method for adjustment of a control device for electronic equipment, comprising:
applying a preload simultaneously to a plurality of shafts of a control device so as to take up initial assembly play, wherein the control device comprises:
an upper actuating element having an upper actuating face, on which a user can exert at least one control action by applying a generally downwardly directed pressure to the upper actuating face,
a lower supporting mounting, the upper actuating element being mounted so as to be movable relative to the lower supporting mounting by a vertical movement between an upper rest position, towards which the upper actuating element may be returned elastically, and an active lower position,
a switch which is actuated by the upper actuating element when the upper actuating element is in the active lower position, and
an articulated structure that is interposed vertically between the upper actuating element and the lower supporting mounting to keep the upper actuating element parallel to a horizontal plane during vertical downward movement of the upper actuating element relative to a frame, and that comprises at least one shaft;
providing an adjustment stop fixed relative to the lower supporting mounting and forming a stop surface which interacts with a facing portion of the at least one shaft by:
positioning a stop member relative to the lower supporting mounting in such a way that a front end of the stop member is in contact with the facing portion of the at least one shaft, wherein the stop member comprises a stop pin that is mounted so as to be axially slidable in a vertical direction in a complementary hole in the lower supporting mounting and has a front end of the stop pin in contact with the facing portion of the at least one shaft, and immobilizing the stop member relative to the lower supporting mounting comprises immobilizing the stop member comprises positioning a plug of adhesive or resin into the hole, in contact with the rear end of the pin, and causing the plug of adhesive to dry or causing the plug of resin to harden; and removing the preload.

9. The method for adjustment according to claim 8, wherein:

the preload is applied by means of a removable preloading pin, which is guided in a vertical sliding movement relative to the lower supporting mounting.

10. The method of adjustment according to claim 8, wherein:

the stop member comprises a plug of adhesive or resin; and the method further comprises drying or curing the adhesive or resin virtually instantaneously by means of a stream of ultraviolet rays to which the adhesive plug is subjected.

11. A method for adjustment of a control device for electronic equipment, comprising:

applying a preload simultaneously to a plurality of shafts of a control device so as to take up initial assembly play, wherein the control device comprises:

an upper actuating element having an upper actuating face, on which a user can exert at least one control action by applying a generally downwardly directed pressure to the upper actuating face, a lower supporting mounting, the upper actuating element being mounted so as to be movable relative to the lower supporting mounting by a vertical movement between an upper rest position, towards which the upper actuating element may be returned elastically, and an active lower position, a switch which is actuated by the upper actuating element when the upper actuating element is in the active lower position, and an articulated structure which is interposed vertically between the upper actuating element and the lower supporting mounting to keep the upper actuating element parallel to a horizontal plane during vertical downward movement of the upper actuating element relative to a frame, and the at least one shaft;

providing an adjustment stop fixed relative to the lower supporting mounting and forming a stop surface which interacts with a facing portion of the shaft by:

positioning a stop member relative to the lower supporting mounting in such a way that a front end of the stop member is in contact with the facing portion of the at least one shaft, wherein the stop member comprises a plug of adhesive or resin, and immobilizing the stop member relative to the lower supporting mounting by drying or curing the adhesive or resin virtually instantaneously by means of a stream of ultraviolet rays to which the adhesive plug is subjected; and removing the preload.

12. The method for adjustment according to claim 11, further comprising coating the facing portion of the shaft with a film of lubricant.

\* \* \* \* \*